(12) United States Patent
Wei et al.

(10) Patent No.: US 11,647,514 B2
(45) Date of Patent: May 9, 2023

(54) COMMUNICATIONS DEVICE, INFRASTRUCTURE EQUIPMENT, WIRELESS TELECOMMUNICATIONS SYSTEM AND METHODS

(71) Applicant: SONY CORPORATION, Tokyo (JP)

(72) Inventors: Yuxin Wei, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 16/091,236

(22) PCT Filed: Mar. 20, 2017

(86) PCT No.: PCT/EP2017/056597
§ 371 (c)(1),
(2) Date: Oct. 4, 2018

(87) PCT Pub. No.: WO2017/174339
PCT Pub. Date: Oct. 12, 2017

(65) Prior Publication Data
US 2019/0159237 A1    May 23, 2019

(30) Foreign Application Priority Data
Apr. 7, 2016 (EP) .................................... 16164323

(51) Int. Cl.
*H04W 72/12* (2023.01)
*H04W 4/029* (2018.01)
(Continued)

(52) U.S. Cl.
CPC ....... *H04W 72/1289* (2013.01); *H04L 1/1887* (2013.01); *H04L 5/0007* (2013.01);
(Continued)

(58) Field of Classification Search
CPC ............. H04W 72/1289; H04W 4/029; H04W 74/0866; H04W 4/40; H04W 72/1242;
(Continued)

(56) References Cited

U.S. PATENT DOCUMENTS

2013/0065626 A1* 3/2013 Yokoyama ........ H04W 74/0875
455/509
2013/0311547 A1* 11/2013 Foti ..................... H04L 67/1025
709/203
(Continued)

FOREIGN PATENT DOCUMENTS

WO    2015128134 A1    9/2015

OTHER PUBLICATIONS

Ahmad et al., "System and Apparatus for Vehicle to Everything (V2X) Wireless Communication", U.S. Appl. No. 62/315,431, filed Mar. 30, 2016 (Year: 2016).*
(Continued)

*Primary Examiner* — Thinh D Tran
(74) *Attorney, Agent, or Firm* — Xsensus LLP

(57) ABSTRACT

A communications device comprising circuitry configured to receive an indication of an allocation of physical resources of a wireless access interface providing plurality of different physical channels of different types, each of the different types of physical channels being defined for transmitting messages in accordance with a different priority level using a contentious access technique. The circuitry configured to identify a relative priority for transmitting one or more messages, select one of the physical channels in accordance with the identified relative priority, and transmit the message via the select physical channel.

19 Claims, 11 Drawing Sheets

(51) Int. Cl.
- *H04L 5/00* (2006.01)
- *H04L 1/1867* (2023.01)
- *H04W 74/08* (2009.01)
- *H04W 4/40* (2018.01)
- *H04W 64/00* (2009.01)
- *H04L 1/00* (2006.01)
- *H04W 72/121* (2023.01)

(52) U.S. Cl.
CPC .......... *H04L 5/0064* (2013.01); *H04L 5/0091* (2013.01); *H04L 5/0094* (2013.01); *H04W 4/029* (2018.02); *H04W 4/40* (2018.02); *H04W 72/1242* (2013.01); *H04W 74/0808* (2013.01); *H04W 74/0866* (2013.01); *H04L 2001/0097* (2013.01); *H04W 64/00* (2013.01); *H04W 72/121* (2013.01)

(58) Field of Classification Search
CPC ............. H04W 64/00; H04W 74/0808; H04W 72/121; H04L 5/0094; H04L 5/0007; H04L 5/0064; H04L 5/0091; H04L 1/1887

See application file for complete search history.

(56) References Cited

U.S. PATENT DOCUMENTS

| | | | |
|---|---|---|---|
| 2014/0141789 A1 | 5/2014 | Tarokh et al. | |
| 2015/0016402 A1* | 1/2015 | Wager | H04L 5/0007 370/329 |
| 2015/0173048 A1 | 6/2015 | Seo et al. | |
| 2016/0174122 A1* | 6/2016 | Sorrentino | H04W 36/22 370/331 |
| 2016/0278126 A1* | 9/2016 | Matsuo | H04W 74/02 |
| 2016/0374054 A1* | 12/2016 | Ma | H04W 4/80 |
| 2016/0381491 A1* | 12/2016 | Watfa | H04W 4/80 455/41.2 |
| 2017/0069207 A1* | 3/2017 | Ma | H04W 76/14 |
| 2017/0071019 A1 | 3/2017 | Wakabayashi et al. | |
| 2017/0188352 A1* | 6/2017 | Lee | H04L 5/0053 |
| 2017/0245292 A1* | 8/2017 | Agiwal | H04W 28/02 |
| 2017/0295554 A1* | 10/2017 | Lee | H04W 56/0015 |
| 2017/0325214 A1* | 11/2017 | Lu et al. | H04W 72/04 |
| 2018/0206260 A1* | 7/2018 | Khoryaev | H04W 72/1263 |
| 2018/0255558 A1* | 9/2018 | Lee | H04W 76/14 |
| 2018/0295653 A1* | 10/2018 | Ashraf | H04W 72/10 |
| 2019/0124489 A1* | 4/2019 | Ahmad | H04W 4/40 |
| 2020/0337067 A1* | 10/2020 | Chae | H04W 72/1263 |

OTHER PUBLICATIONS

ETSI TS 101 539-3 V1.1.1 (Nov. 2013), "Intelligent Transport Systems (ITS); V2X Applications; Part 3: Longitudinal Collision Risk Warning (LCRW) application requirements specification", ETSI TS 101 539-3 V1.1.1 Nov. 2013 (Year: 2013).*

Communication pursuant to Article 94(3) EPC issued in European Application 17 711 668.8-1215 dated Dec. 19, 2019.

"3rd Generation Partnership Project; Technical Specification Group Services and System Aspects; Study on LTE support for Vehicle to Everything (V2X) services (Release 14)," 3GPP TR 22.885 V14.0.0, Technical Report, pp. 1-50 (Dec. 2015).

"Intelligent Transport Systems (ITS); V2X Applications; Part 3: Longitudinal Collision Risk Warning (LCRW) application requirements specification," ETSI TD 101 539-3 V1.1.1, pp. 1-29 (Nov. 2011).

"Intelligent Transport Systems (ITS); Vehicular Communications; Basic Set of Applications; Part 1: Functional Requirements," ETSI TS 102 637-1 V1.1.1, Technical Specification, pp. 1-60 (Sep. 2010).

"Intelligent Transport Systems (ITS); Vehicular Communications; Basic Set of Applications; Part 2: Specification of Cooperative, Awareness Basic Service," ETSI TS 102 637-2 V1.1.1, Technical Specification, pp. 1-22 (Apr. 2010).

"Intelligent Transport Systems (ITS); Vehicular Communications; Basic Set of Applications; Part 3: Specifications of Decentralized Environmental Notification Basic Service," ETSI TS 102 637-3 V1.1.1, Technical Specification, pp. 1-46 (Sep. 2010).

"New SI proposal: Feasibility Study on LTE-based V2X Services," 3GPP TSG RAN Meeting #68, RP-151109, pp. 1-7 (Jun. 15-18, 2015).

"Text Proposal capturing outcome of email discussion," 3GPP TSG-RAN WG2 #92, R2-156300, pp. 1-9 (Nov. 16-20, 2015).

Holma, H. and Toskala, A., "LTE for UMTS OFDMA and SC-FDMA Based Radio Access", John Wiley & Sons Limited, pages (2009).

Holma, H. and Toskala, A., "LTE for UMTS OFDMA and SC-FDMA Based Radio Access", John Wiley & Sons Limited, pp. 1-8 (Jan. 2010).

McGurrin, M., "Vehicle Information Exchange Needs for Mobility Applications," Final Report FHWA-JPO-12-021, pp. 1-46 (Feb. 13, 2012).

International Search Report for International Application No. PCT/EP2017/056597, dated Jul. 4, 2017.

* cited by examiner

COMMUNICATIONS DEVICE, INFRASTRUCTURE EQUIPMENT, WIRELESS TELECOMMUNICATIONS SYSTEM AND METHODS

BACKGROUND

Field of Disclosure

The present disclosure relates to communications devices, infrastructure equipment, wireless telecommunications systems and methods. Embodiments of the present technique can provide contention based access to resources.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Long Term Evolution (LTE) networks are finding new areas of deployment with each new 3GPP Release. Release 12 introduced Public Safety aspects on device-to-device communications, and Release 13 continues to develop the D2D concepts further. In Release 14 stage 3GPP starts to discuss vehicular communications, effectively considering whether and how LTE networks could support Intelligent Transport Systems (ITS).

The automotive industry has been working for several years on solutions to enable communication with and between vehicles so as to help improve traffic flow and safety. These techniques range from automatic tolling technologies to collision prevention mechanisms, and are generally known as Intelligent Transport Systems (ITS). Currently, the main radio technology that is being considered in standards projects is a WLAN derivative 802.11p, which would be used for broadcasting ITS information to vehicles. This constitutes a so-called Dedicated Short Range Communication (DSRC) system that is deployed at 5.9 GHz ITS band in Europe (there may be different ITS bands in use in other regions, e.g. 700 MHz in Japan).

The effective range of DSRC systems is a few hundred meters and the services are broadcast oriented (emergency vehicle notices, for example). It is considered that mobile telecommunications networks, such as Long Term Evolution (LTE) on International Mobile Telecommunications (IMT) bands, could fulfil at least some of the ITS needs, and also provide wider and cheaper coverage. In particular, where the existing cellular network already covers roadways the capital expenditure costs may be a fraction of what is needed for setting up a new DSRC-based ITS network.

LTE is understood to play an increasingly important role in the connected car ecosystem LTE based solutions may in particular bring improvements in spectral efficiency, effective communications range, throughput, error resiliency and Quality of Service.

Connected vehicle systems are called V2X, which consists of V2V (vehicle-to-vehicle), V2P (vehicle-to-pedestrian), V2I (vehicle-to-infrastructure) and V2N (vehicle-to-network). Infrastructure in this case may be the roadside ITS related infrastructure or backbone systems in Internet or mobile networks. Some examples or services in connected car environment are Cooperative Awareness Message (CAM) and Decentralised Environmental Notification (DEN). These constitute applications such as allowing emergency vehicles to broadcast their presence and allowing roadside infrastructure to broadcast speed limit information to vehicles. It is envisaged that LTE will work with 802.11p in order to provide such services, and that both radio technologies will likely find applications in the connected vehicle ecosystem.

Contention Based (CB) uplink transmission is a suitable scheme to improve latency performance for V2X applications. As an illustration, V2X systems can be required to have a delay of less than 100 ms from an event to a corresponding action. For example, from the moment a first car in front of a second car suddenly brakes until the second car starts braking as well, the time must be less than 100 ms in some circumstances. This takes into account the time for the first vehicle to detect the braking, signal the braking to other vehicles, the second vehicle receiving the signal, processing the signal to decide whether to take any actions, up to the moment the second vehicle actually starts braking. Such a delay requirement therefore does not leave much time for the first vehicle to signal the situation to the other vehicles, including the second vehicle, and the V2X communications should be carried out in a high priority, high reliability and low-latency manner as much as possible. A low priority may delay the communications more than necessary, a low reliability may result in retransmissions being carried out which also significantly increase the delay in the transmissions while a high latency clearly increases the risk of taking up too much of the time period allocated from an event to the corresponding action. Accordingly, collision should be reduced as much as possible in order to improve the CB based uplink transmission performance whilst also reducing the time spent on the scheduling request and response. Although some collision is inevitable, there should be measures to reduce it, especially for high priority V2X messages. The present disclosure aims to overcome this problem.

SUMMARY

In a first aspect, the present technique provides a communications device for transmitting a message to an infrastructure equipment of a mobile communications network, the communications device comprising: a transmitter configured to transmit signals via a wireless access interface provided by the infrastructure equipment, a receiver configured to receive signals from the infrastructure equipment via the wireless access interface, and a controller configured to control the transmitter and the receiver to transmit and/or receive the signals, the controller being configured with the receiver to receive an indication of an allocation of physical resources of the wireless access interface providing plurality of different physical channels of different types, each of the different types of physical channels being defined for transmitting messages in accordance with a different priority level using a contentious access technique, the allocation of the physical resources being dependent upon the priority of the message and the contentious access technique, and the controller is configured with the transmitter to identify a relative priority for transmitting one or more of the messages to the infrastructure equipment, to select one of the physical channels in accordance with the identified relative priority, and to transmit the message via the select physical channel, wherein the message is transmitted via the selected physical channel in accordance with the contentious access technique determined for the selected physical channel provided by the received indication.

Embodiments of the present technique can provide contention based access to resources by allocating physical resources of the wireless access interface. A plurality of physical channels are provided, each of the physical channels being allocated for transmitting messages based on a priority level of the messages. The controller of the communications is then configured to identify the priority of the message to be transmitted and select the appropriate physical channel based on the identified priority of the message to be transmitted. The controller is then configured with the transmitter to transmit the message in accordance with the contentious access technique associated with the selected physical channel. The allocation of physical resources and physical channels is received from via a wireless access interface provided by an infrastructure equipment.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present technique are defined in the appended claims, which include an infrastructure equipment a wireless communications system and methods of controlling a communications device and an infrastructure equipment.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
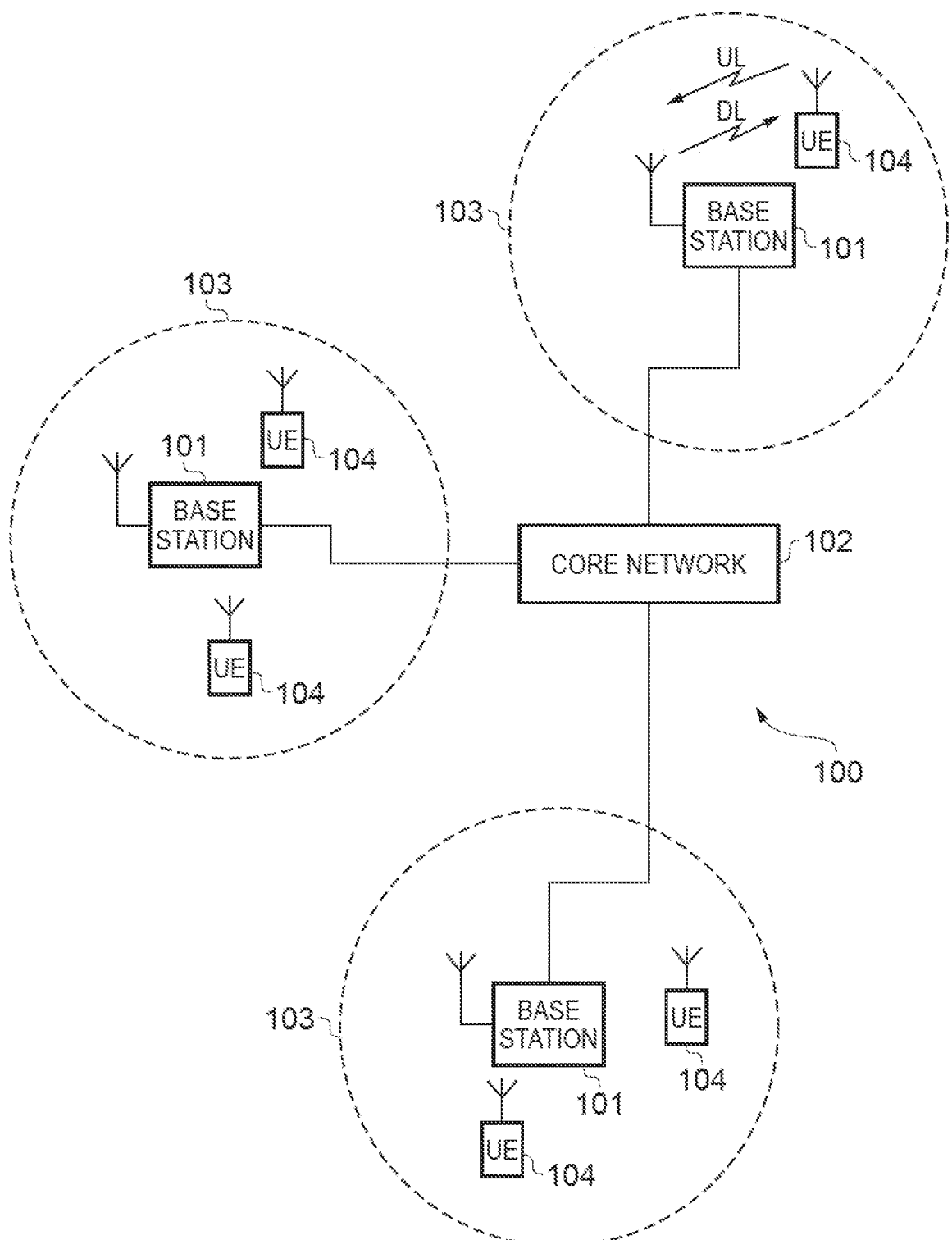
FIG. 1 schematically illustrates some basic functionality of a conventional mobile telecommunications network.

Referring now to the drawings, wherein like reference numerals designate identical or corresponding parts throughout the several views.

FIG. 1 provides a schematic diagram illustrating some basic functionality of a conventional mobile telecommunications network using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of infrastructure equipment 101 connected to a core network 102. Each infrastructure equipment provides a coverage area 103 (i.e. a cell) within which data can be communicated to and from communications devices 104. Data is transmitted from infrastructure equipment 101 to communications devices 104 within their respective coverage areas 103 via a radio downlink. Data is transmitted from communications devices 104 to the infrastructure equipment 101 via a radio uplink. The uplink and downlink communications are made using radio resources that are licensed for use by the operator of the network 100. The core network 102 routes data to and from the communications devices 104 via the respective infrastructure equipment 101 and provides functions such as authentication, mobility management, charging and so on. Communications devices may also be referred to as terminal devices, mobile stations, user equipment (UE), user terminal, mobile terminal, mobile device, terminal, mobile radio, and so forth. Infrastructure equipment may also be referred to as base stations, transceiver stations/nodeBs/e-nodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The infrastructure equipment 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the infrastructure equipment 101 may be realized as any other types of infrastructure equipment such as a NodeB and a base transceiver station (BTS). The infrastructure equipment 101 may include a main body (that is also referred to as an infrastructure equipment apparatus) configured to control radio communication, and one or more remote radio heads (RRH) disposed in a different place from the main body. In addition, various types of terminals, which will be described below, may each operate as the infrastructure equipment 101 by temporarily or semi-persistently executing a infrastructure equipment function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the communications device 104 may be a radio communication module (such as an integrated circuit module including a single die) mounted on each of the terminals In the present disclosure, an infrastructure equipment providing a small cell is generally differentiated from a conventional infrastructure equipment mostly (and sometimes exclusively) in the range provided by the infrastructure equipment. Small cells include for example the cells also called femtocell, picocell or microcell. In other words, small cells can be considered as similar to macrocells in the channels and features provided to the terminals, but with the use of less power for infrastructure equipment transmissions, which results in a smaller range. A small can therefore be the cell or coverage provided by a small cell infrastructure equipment. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from an infrastructure equipment and for retransmitting the received signals to a communications device in a mobile communications network, or to receive signals transmitted from a communications device for re-transmission to an infrastructure equipment of a mobile communications network. The aim of such relay nodes is to try to extend a radio coverage area provided by a mobile communications network to reach communications devices which would otherwise be out of range of the mobile communications network or to improve the ratio of successful transmissions between a communications device and an infrastructure equipment.

A mobile network which includes a variety of infrastructure equipment and/or relay nodes (e.g. macro-cell base stations, small cell base stations and/or relays) is sometimes referred to as a heterogeneous network.

Figure 2:
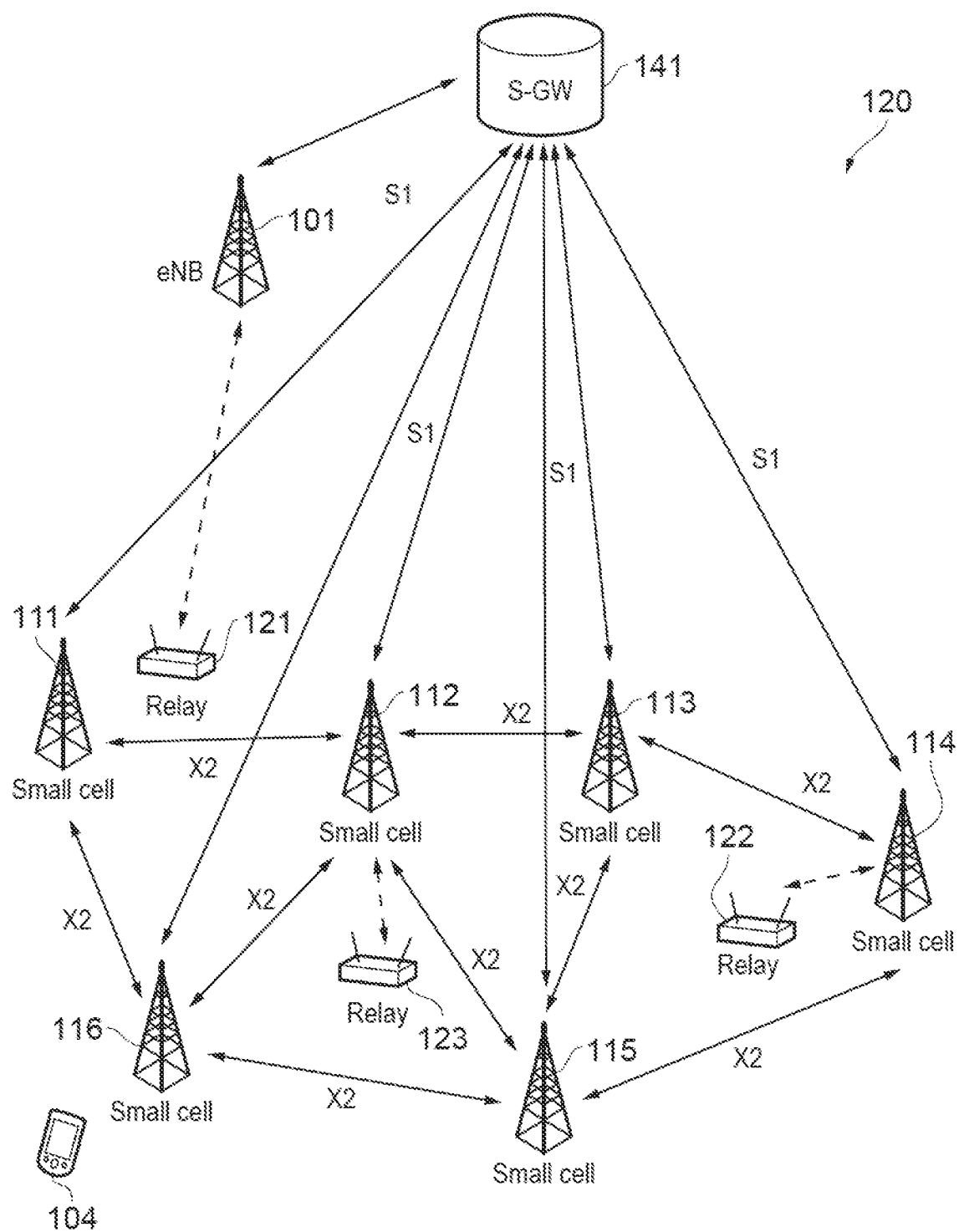
FIG. 2 schematically illustrates an example heterogeneous system for communicating with at least one communications device.

FIG. 2 illustrates an example heterogeneous system 120 for communicating with at least a terminal 104. In this system 120, an infrastructure equipment (eNB) 101 provides a macrocell and six infrastructure equipment 111-116 provide small cell coverage, potentially overlapping with the coverage of the infrastructure equipment 101. Additionally, three RN 121-123 are provided and are operating with infrastructure equipment 101, 114 and 122, respectively. A relay node can generally be defined as a wireless radio access point for relaying transmission and which thus does not implement all of the functionalities of a infrastructure equipment. It is in general not directly connected to the core network but uses wireless access (inband or outband) for backhaul link to connect with a infrastructure equipment. In other examples, the backhaul link may also be provided over a wired connection. This is in contrast to a small cell infrastructure equipment which, as mentioned above, can generally operate like a infrastructure equipment and is thus connected to the core network as illustrated by the arrows between the small cell infrastructure equipment 111-116 and the Serving Gateway "S-GW" 141 in FIG. 2.

Figure 3:
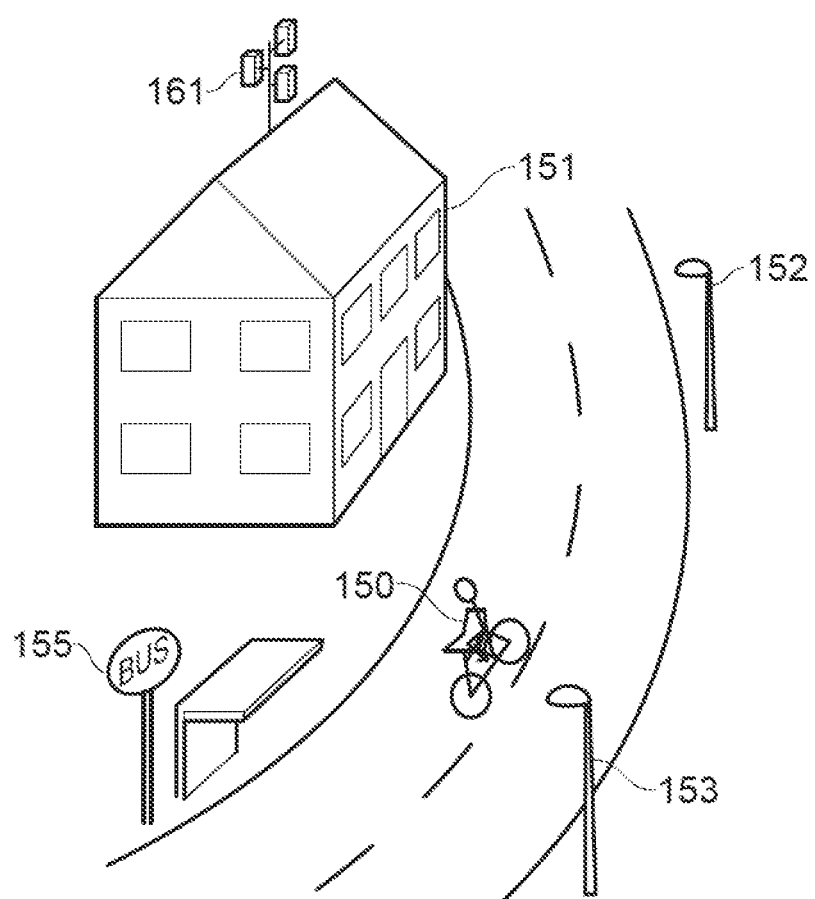
FIG. 3 schematically illustrates another example heterogeneous system for communicating with at least one communications device.

Another example of a heterogeneous environment is illustrated in FIG. 3, where a macrocell base station 161 is provided in the same area as small cells provided by a base station 151 in or in the vicinity of a building, by a base station 152 in a first lamppost, by a base station 153 in a second lamppost, by a base station 155 provided in a bus stop and by a mobile base station 156 provided in a cyclist back-pack. In another example, the infrastructure unit 153 and 152 in lamp posts may be relay nodes relaying data in the uplink and/or downlink to the macrocell base station 161 or to another infrastructure unit (e.g. another relay node). In this example, the interference and link quality experience can vary greatly depending on traffic and on time: the cyclist may enter an interference/poor link quality zone and later leave this are, while the base station 151, if associated with an office, may potentially only be used during office hours and may be turned off during the rest of the day or the rest of the week. In such a heterogeneous network, a terminal which is V2X-capable may wish to communicate with any of the other nodes in the area depending on the circumstances, such as whether the terminal is associated with a vehicle and moving.

LTE Wireless Access Interface

A brief description of the LTE wireless access interface is explained in the following paragraphs with reference to FIGS. 4 and 5 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. In accordance with the present technique, the wireless access interface for both the downlink shown in FIG. 4 and the up-link shown in FIG. 5 can provide a facility for communicating data from a communications device (UE) to a mobile communications network via the infrastructure equipment (eNB) and for communicating data to the UE from the eNB, but can also provide communications resources for performing D2D communications to another communications device without being communicated via the eNB. The down-link and the up-link of the wireless access interface of FIGS. 4 and 5 respectively will now be explained.

Figure 4:
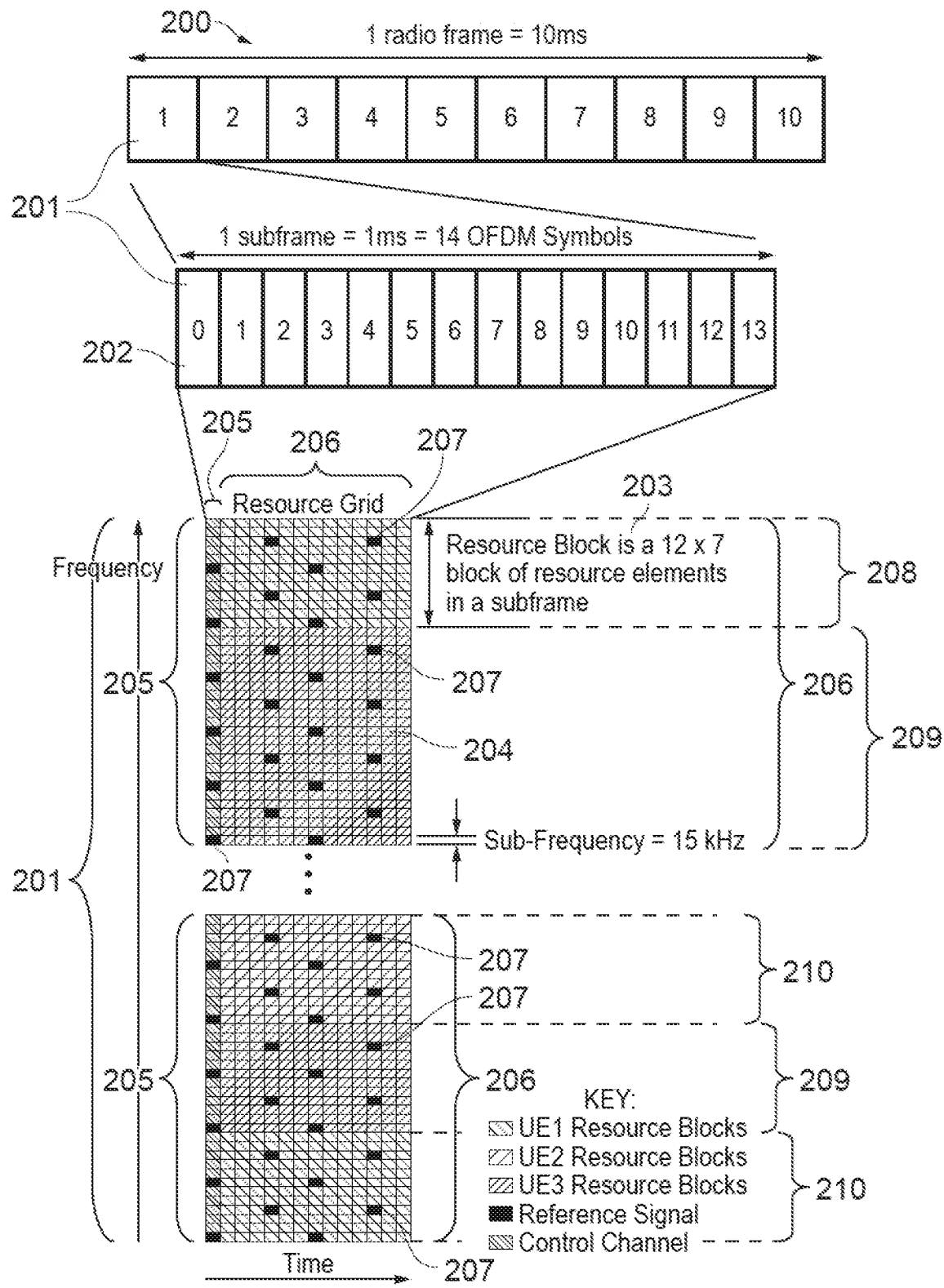
FIG. 4 schematically illustrates the structure of a downlink of a wireless access interface.

FIG. 4 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 4, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 5:
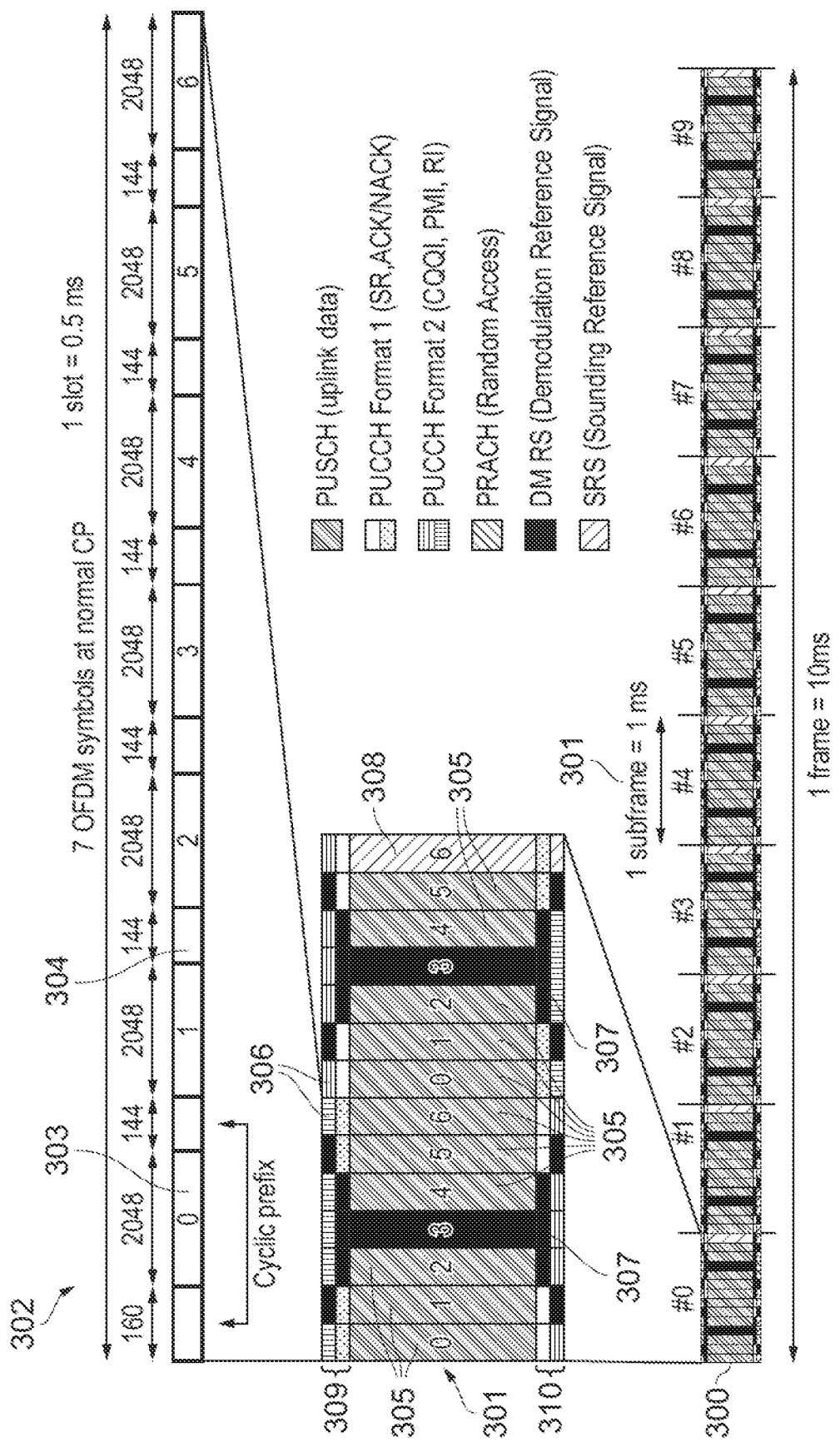
FIG. 5 schematically illustrates the structure of an uplink of a wireless access interface.

FIG. 5 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

V2X Communications Systems

As previously mentioned, LTE networks are finding new areas of deployment with each new 3GPP Release, in particular whether and how LTE networks could support Intelligent Transport Systems (ITS) such as connected vehicle systems (V2X). Infrastructure in this case may be the roadside ITS related infrastructure or backbone systems in Internet or mobile networks. Some examples or services in connected car environment are Cooperative Awareness Message (CAM) and Decentralised Environmental Notification (DEN). These constitute applications such as allowing emergency vehicles to broadcast their presence and allowing roadside infrastructure to broadcast speed limit information to vehicles. It is envisaged that LTE will work with 802.11p in order to provide such services, and that both radio technologies will likely find applications in the connected vehicle ecosystem in order to support wider coverage. An advantage provided by an LTE communications network is that network level optimisation can be performed with some control entities, for example eNBs and Road Side Units (RSU), in order to improve spectrum efficiency and reliability. However since communications networks operating in accordance 802.11p are already being deployed, a further advantageous coexistence between LTE and 802.11p based solutions can be provided.

Figure 6:
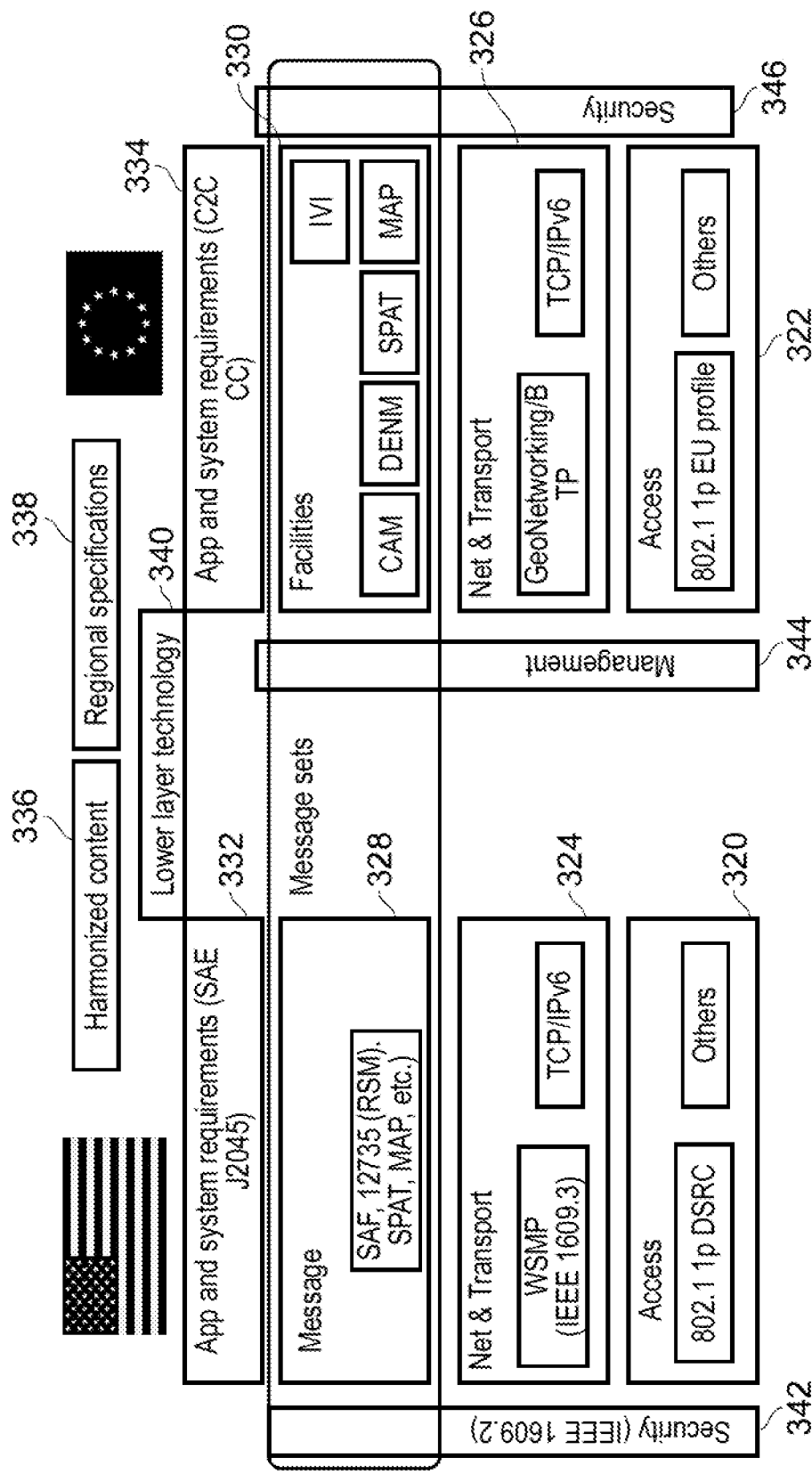
FIG. 6 schematically illustrates different layers in a communication hierarchy.

A diagram illustrating system integration is shown in FIG. 6. FIG. 6 also provides a schematic illustration of different layers in a communication hierarchy which are currently being applied by Europe and the United States. As shown in FIG. 6, physical layer access techniques are shown within boxes 320, 322 whereas transport layer techniques are shown within boxes 324, 326. At a message layer, different messages are generated and different facilities provided within boxes 328 and 330. Application and system requirements are represented within boxes 332, 334 and various other influences such as harmonised content 336, regional specifications 338 and lower layer technology requirements 340 are shown. Requirements and protocols for security 342, management 344 and security 346 are represented.

V2X Communication Scenarios

Figure 7:
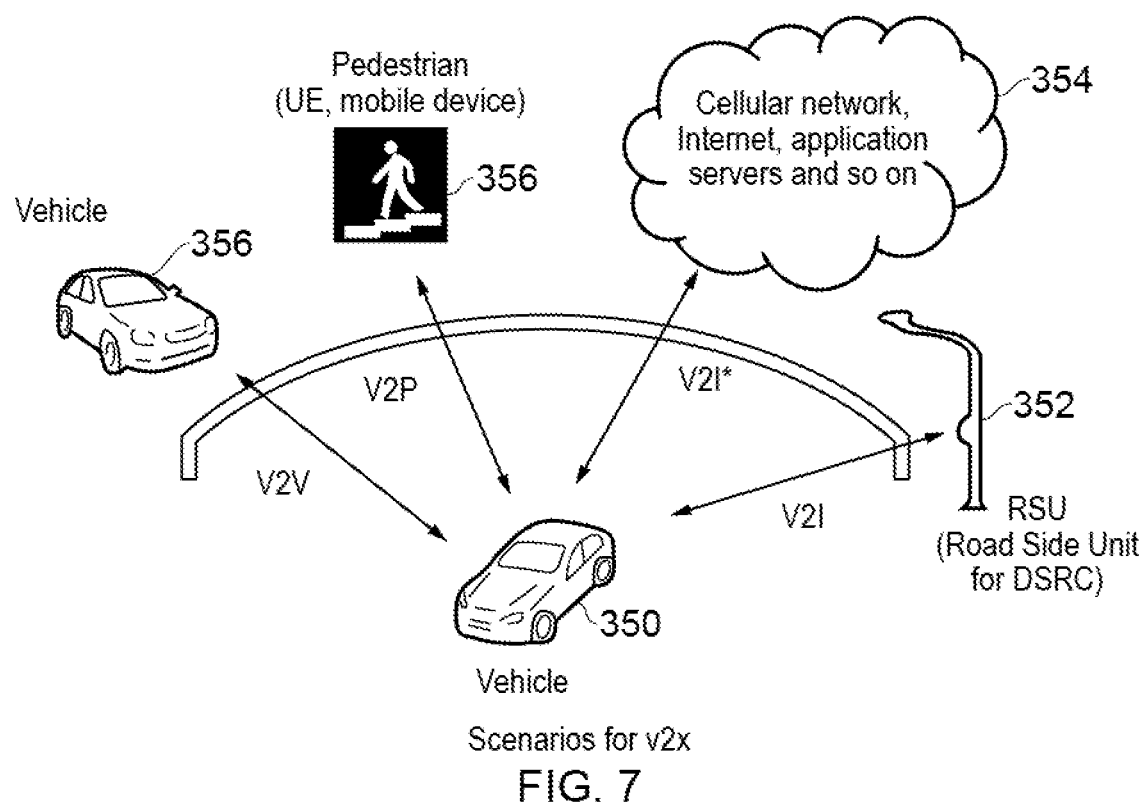
FIG. 7 schematically illustrates various V2X communication scenarios.

V2X communication scenarios currently being considered are represented in FIG. 7. As shown in an illustration in FIG. 7, a vehicle 350 may conduct V2X communications of various types between a roadside unit 352, a Wi-Fi network 354, a pedestrian 356 or indeed another vehicle 358. As such, the "X" in V2X could be:

V2V (vehicle-to-vehicle): covering LTE-based communication between vehicles.

V2P (vehicle-to-pedestrian): covering LTE-based communication between a vehicle and a device carried by an individual (e.g. handheld terminal carried by a pedestrian, cyclist, driver or passenger).

V2I/N (vehicle-to-infrastructure/network): covering LTE-based communication between a vehicle and a roadside unit/network. A roadside unit (RSU) is a transportation infrastructure entity (e.g. an entity transmitting speed notifications) implemented in an eNodeB or a stationary UE Message Types There are two types of V2X message in terms of V2X application requirements. The first type of message is event-triggered whilst the second type of message is periodic. V2X messages are defined by standards developing organizations (SDO) for each region. In the context of ETSI ITS standards (Europe), event-triggered messages are Decentralized Environmental Notification Messages (DENMs), and periodic messages are Cooperative Awareness Message (CAM).

V2X need to send event triggered messages during an event. According to the ETSI Specifications of Decentralized Environmental Notification Basic Service [2], an "event" is defined as a road hazard situation, a driving environment situation, or a traffic condition situation. It is also noted that an event potentially has an impact on the road safety, the traffic efficiency and/or the driving conditions. The ETSI Specifications of Decentralized Environmental Notification Basic Service [2] also defines the details of Decentralized Environmental Notification Messages (DENMs), which is mainly used for event-trigger transmission. Decentralized Environmental Notification Messages (DENMs) are mainly used by the Cooperative Road Hazard Warning (RHW) application in order to alert road users of the detected events. The RHW application is an event-based application composed of multiple use cases. The general processing procedure of a RHW use case is as follows: Upon detection of an event that corresponds to a RHW use case, the ITS station immediately broadcasts a DENM to other ITS stations located inside a geographical area and which are concerned by the event. The transmission of a DENM is repeated with a certain frequency. This DENM broadcasting persists as long as the event is present.

V2X also need to send regular periodic reports such as the current position of the vehicle, the speed of the vehicle, the direction of travel of the vehicle, the type, make and/or model of the vehicle, and so on. The ETSI Specifications of Cooperative Awareness Basic Service [3] has defined the details of Cooperative Awareness Messages (CAM), which are mainly used for regular periodic reports. The Cooperative Awareness Basic Service provides, by means of periodic sending of status data, a cooperative awareness to neighbouring nodes, such as other vehicles. Quality requirements are also proposed in [3] for this mandatory facility in order to provide reliable component performance for application development.

The ETSI Functional Requirements [4] defines which type of message is to be used for a specific application. For example, [4] specifies four use cases for CAM:

UC001: Emergency vehicle warning;
UC002: Slow vehicle indication;
UC003: Intersection collision warning;
UC004: Motorcycle approaching indication.

[4] then specifies 13 use cases for DENM:

UC005: emergency electronic brake lights;
UC006: wrong way driving warning;
UC007: stationary vehicle warning—accident;
UC008: stationary vehicle warning—vehicle problem;
UC009: traffic condition warning;
UC010: signal violation warning;
UC011: roadwork warning;
UC012: collision risk warning;
UC013: decentralized floating car data—hazardous location;
UC014: decentralized floating car data—precipitation;
UC015: decentralized floating car data—road adhesion condition;
UC016: decentralized floating car data—visibility condition;
UC017: decentralized floating car data—wind problem.

In addition, 3GPP defines typical use cases of V2X in the "Study on LTE support for Vehicle to Everything (V2X) services" [5]. This shows the potential requirements and using which type of messages, event-driven V2X messages or periodic V2X messages. Generally event triggered messages are higher priority than regular periodic messages due to the nature of the information being transmitted in the respective message types. As discussed above, event triggered messages relate to, for example, emergencies or road hazard situations whilst periodic message relate to, for example, vehicle position reporting or vehicle speed and direction reporting.

In addition to distinguishing the priority level of a message to be transmitted based on the message type, the priority level could be different for messages of the same message type depending on the criticality of the traffic situation. For example, the ETSI Longitudinal Collision Risk Warning (LCRW) application requirements specification [6] specifies in section 5.3.1 three different priority levels (0-2) for event triggered messages (DENMs). In this case, a priority level of 2 represents a normal or driver awareness situation whilst a priority level of 0 represents a pre-crash situation. Accordingly, messages with a priority level 0 are most critical whilst messages with a priority level 2 are least critical whilst still being of the same message type, namely event triggered messages or DENMS.

In addition to the ETSI ITS standards, a Basic Safety Message (BSM) standard [7] is defined by the US department of transportation (USDOT). BSM Part 1 relates to regular periodic message transmission including vehicle position, heading, speed, acceleration, steering wheel angle and vehicle size. BSM Part 2 contains a variable set of data elements drawn from an extensive list of optional elements. They are selected based on event triggers, such as the ABS being activated.

Contention Based Uplink Transmission in Local Cell

As previously mentioned, there is a need for infrastructure equipment to efficiently use the communication resources made available to it for communicating with communications devices. At the same time, it is desirable to maintain a low communication latency with respect to the communications devices.

One way of achieving this is for the communications devices to use contention based (CB) transmission when transmitting signals to the local cell on the Physical Uplink Shared Channel (PUSCH). CB transmission allows multiple communications devices to use the same uplink resources. The assumption is that, most of the time, two communications devices will not wish to transmit PUSCH data simultaneously using those same resources, and there will therefore be no collision (as occurs when more than one communications device in the group tries to use the single CB grant). When there is a collision, however, measures are taken to allow re-transmission of the data from each communications device (using different resources, for example). The result is that the total number of resources dedicated for use by a particular group of communications devices (together with any associated signalling) can be reduced. The cost is a small increase in communication latency in the event of a collision (since the data from each communications device then needs to be re-transmitted). CB transmission as used for physical uplink shared channel (PUSCH) transmission is discussed in detail in [8], for example.

The characteristics of CB PUSCH as known include:

(1) A single set of specific resource blocks (which may be referred to as a single CB grant) is allocated to communications devices for use in CB uplink transmission. At any one time, a communications device that wishes to perform a CB PUSCH transmission must attempt to use this single CB grant. When two communications devices attempt to perform a CB PUSCH transmission simultaneously using this single CB grant, there is a collision.

(2) The CB grant is transmitted by the eNB using the physical downlink control channel (PDCCH). All the communications devices must therefore monitor the PDCCH for the CB grant. The CB grant may be transmitted either by dynamic scheduling or semi-persistent scheduling (SPS). If SPS is used, then the resource pattern of the CB grant is pre-defined with fixed periodicity and resource block (RB) allocation.

(3) There is no differentiation between communications devices. Each communications device has the same access probability.

(4) There is no indication on how to harmonize CB PUSCH with conventional scheduling request (SR) based PUSCH.

Contention Based (CB) uplink transmission is a suitable scheme to improve latency performance for V2X applications. The range of speed for vehicles can be up to 280 kph at an operating frequency of up to 6 GHz whilst V2X systems can be required to have a delay of less than 100 ms from an event to a corresponding action. Such as delay therefore does not leave much time for the first vehicle to signal the situation to other vehicles and the V2X comminations should be carried out in a high priority, high reliability and low-latency manner as much as possible.

A low priority may delay the communications more than necessary, a low reliability may result in retransmissions being carried out which also significantly increase the delay in the transmissions while a high latency clearly increases the risk of taking up too much of the time period allocated from an event to the corresponding action. Accordingly, collision should be reduced as much as possible in order to improve the CB based uplink transmission performance whilst also reducing the time spent on the scheduling request and response.

Contention based uplink transmission is a suitable scheme to improve latency performance which is the basic requirement for safety V2X applications, such as emergencies or road hazard situations. Even for non-safety V2X, such as vehicle position reporting or vehicle speed and direction reporting, low latency is also a key performance requirement. Accordingly, the CB PUSCH needs to be enhanced by considering the characteristics of V2X.

In general, the use of a CB UL transmission solution reduces the time spent on scheduling requests and responses. However, too many collisions will increase the delay (due to the need for communications devices to re-transmit data when there is a collision). Although collisions are inevitable when using CB transmission, their occurrence should be reduced as much as possible in order to maintain system performance. There is therefore a need to reduce the amount of collision for CB based uplink transmission.

Embodiments of the present disclosure aim to reduce the collision in contention based UL transmission especially for high priority V2X messages by distinguishing the difference between periodical messages and event triggered messages in the CB-PUSCH transmission. The characteristics of these two types of messages are different, hence in the process of CB-PUSCH, they are processed in different ways.

Accordingly, a CB uplink transmission for V2X services is proposed. In the applicant's co-pending European patent application number 15194635, the CB uplink transmission for V2X services are based on a D2D transmission mode. In this transmission mode, before transmission of a message, the communications devices need to monitor the Scheduling Control (SC) information, both in scheduled and autonomous mode. In accordance with the present disclosure, vehicle communications devices do not need to monitor any control information prior to the first attempt to transmit a message. Instead, the communications devices only transmit the message directly. If the first attempt is successful, the delay is reduced significantly comparing with the D2D scheme.

Figure 8:
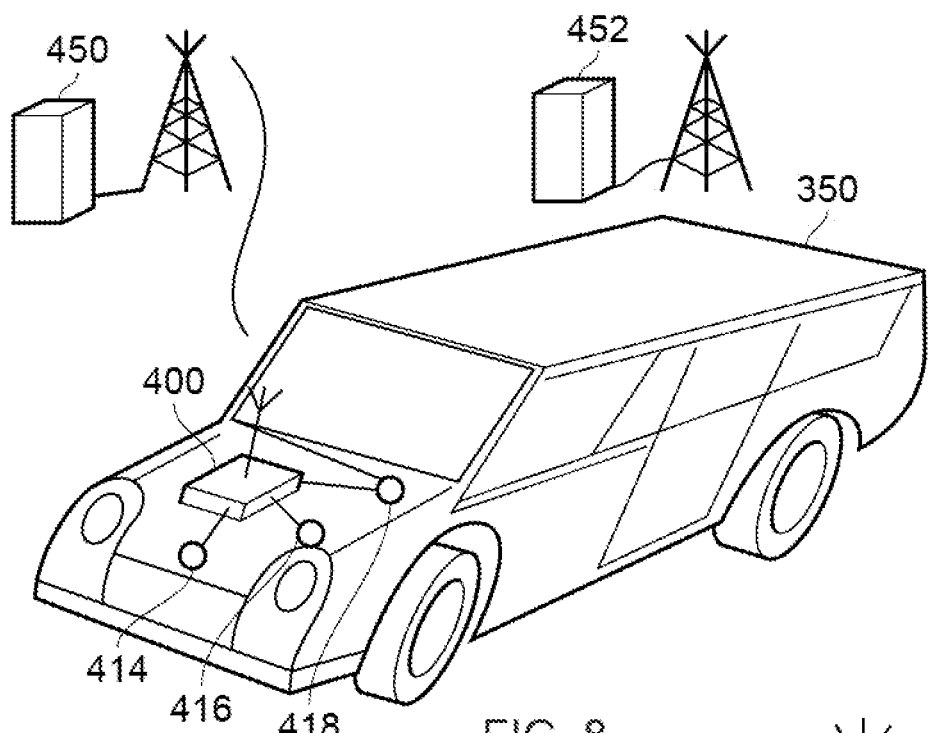
FIG. 8 schematically illustrates a vehicle according to an embodiment of the present disclosure FIG. 9 schematically illustrates an infrastructure equipment and a communications device according to an embodiment of the present disclosure.
Figure 8:
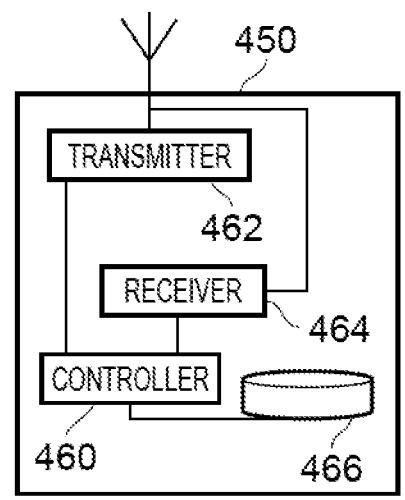

As shown in FIG. 8, a vehicle 350 includes a mobile communications device 400 which receives input from various modules 414, 416, 418. The communications device or UE 400 is able to transmit and receive signals via roadside unit 450, 452 using different contention based techniques depending on the type of data generated by the respective modules 414, 416, 418. As will be explained below the different modules 414, 416, 418 may generate data for communication requiring different priorities and latencies.

Figure 9:
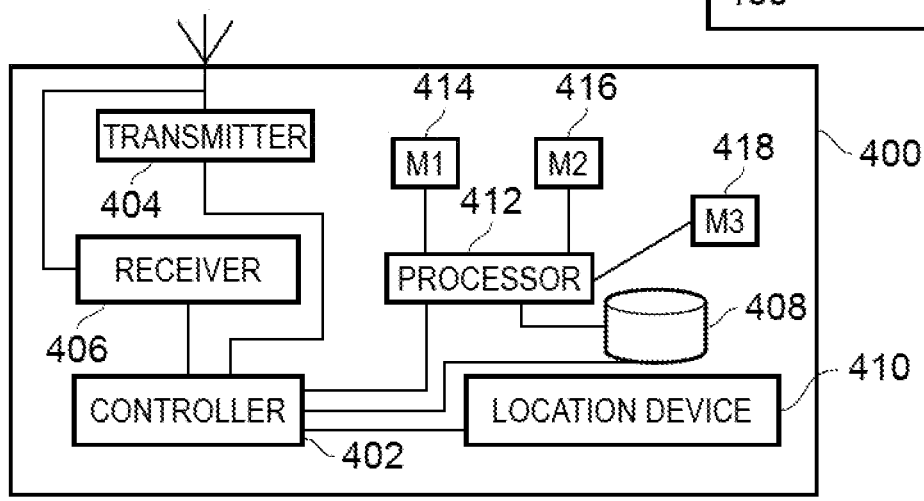

FIG. 9 schematically illustrates an infrastructure equipment (eNB) 450 for use with a mobile communications network and the communications device (UE) 400 in more detail according to an embodiment of the present disclosure. A wireless telecommunications system may comprise the infrastructure equipment 450 and the communications device 400.

The infrastructure equipment 450 comprises a transmitter 462 configured to transmit signals to one or more communications devices (or UEs) via a wireless access interface, a receiver 464 configured to receive signals from the one or more communications devices via the wireless access interface and a storage medium 466 for storing indications of an allocation of physical resources of the wireless access interface to be transmitted to the one or more communications devices. The operation of each of the transmitter 462, receiver 464 and storage medium 466 is controlled by the controller 460.

The communications device 400 according to an embodiment of the present disclosure comprises a transmitter 404 configured to transmit signals to the infrastructure equipment via a wireless access interface provided by the infrastructure equipment. The transmitter may also be configured to transmit signals to another communications device (using a D2D communication technique, for example). The communications device also comprises a receiver 406 configured to receive signals from the infrastructure equipment via the wireless access interface provided by the infrastructure equipment. The receiver may also be configured to receive signals from another communications device (again, using a D2D communication technique, for example). The communications device may also comprise a storage medium 408 for storing indications of the allocation of physical resources of the wireless access interface received from the infrastructure equipment, and a location unit 410 for determining a geographical location of the communications device 400. The communications device may also comprise one or more applications running on a processor 412 and/or one or more modules 414, 416, 418. The operation of each of the transmitter 404, receiver 406, storage medium 408, location unit 410, is controlled by the controller 402. Also shown are a processor 412 and the modules 414, 416, 418.

Contention Pool Allocation Based on Message Type

In V2X, the latency requirement varies according to the message types. For example, a pre-crash sensing warning message needs to be transmitted within 20 ms, whilst for a queue warning message the maximum latency is 100 ms. Furthermore, different messages will have different priorities. Some messages are triggered by events, such as a wrong way driving warning or a pre-crash warning which indicate certain emergency cases have occurred. Other messages are periodically triggered, for example to report the speed or location of vehicle. These messages are of a lower priority. Different messages should have separate contention pools (physical resources), in order to reduce the negative impact of collisions on the high priority messages.

In an embodiment of the present disclosure, the controller 460 of the infrastructure equipment 450 is configured to determine an allocation of physical resources of the wireless access interface providing a plurality of different physical channels of different types. Each of the different types of physical channels is defined for transmitting messages in accordance with a different priority level using a contentious access technique. The allocation of the physical resources is dependent upon the priority of the message and the contentions access technique. The controller 460 is then configured with the transmitter 462 to transmit an indication of the determined allocation of physical resources of the wireless access interface to the one or more communications devices 400 via the wireless access interface.

In an embodiment of the present disclosure, the controller 402 of the communications device 400 is configured with the receiver 406 to receive an indication of an allocation of physical resources of the wireless access interface providing plurality of different physical channels of different types. Each of the different types of physical channels is defined for transmitting messages in accordance with a different priority level using a contentious access technique. The allocation of the physical resources is dependent upon the priority of the message and the contentious access technique. The controller 402 is then configured to identify a relative priority for transmitting one or more of the messages to the infrastructure equipment 201. The controller 402 is then configured with the transmitter 404 to select one of the physical channels in accordance with the identified relative priority, and to transmit the message via the select physical channel. The message is transmitted via the selected physical channel in accordance with the contentious access technique determined for the selected physical channel provided by the received indication.

The relative priority of the message to be transmitted, as identified by the controller 402 of the communications device 400 may be based on the type of message, for example event triggered (DENM) or periodic (CAM). Since event triggered messages relate to emergency situations or road hazards, they typically have a higher priority than periodic messages. The relative priority of the message to be transmitted may also be based on the priority level of the message within a given message type. For example, [6] specifies three different priority levels (0-2) for event triggered messages (DENMs). Accordingly, event triggered messages with a priority level 0 may be given a higher relative priority that event triggered messages with a priority level 2. This also allows the relative priority of the message to be transmitted to be based on the critically of the event to winch the message relates, for example an accident, vehicle break down or a pre-crash warning. The relative priority of the message to be transmitted may also be related to the message latency requirement. For example, messages related to accidents have a maximum latency requirement of 100 ms whilst some periodic messages, such as those related to cooperative adaptive cruise control, have a maximum latency requirement of 1 s. Accordingly, the relative priority of messages with a lower maximum latency requirement will be higher than for messages with a higher maximum latency requirement.

According to the present disclosure high priority messages, such as messages with a stringent latency requirement or emergency case triggered event messages, are allocated a separate contention pool or physical resources. Further, the size of the contention pool, such as the amount of physical resource and number of physical channels allocated is based on the relative priority level of the messages to be transmitted such that higher priority messages are allocated more physical resource and more physical channels than lower priority messages. Accordingly, the access probability is proportional to the priority of the message to be transmitted, such that higher priority messages have a higher access probability than lower priority messages. In other words, time and safety critical messages will be successfully transmitted at the first attempt at the expense of lower priority, status and information related messages.

The indication to the communications devices to allocate high priority messages to the separate high priority contention pool or physical resource could be realized by broadcast signalling (a single contention pool or multiple contention pools will be allocated for all the vehicles within the broadcast coverage), by dedicated signalling (a single contention pool or multiple contention pools will be allocated for a group of vehicles, semi-static allocation is possible), or by layer 1 dynamic signalling (especially useful when the resource pool is of single UL grant). When the transmit communications device, such as a vehicle UE, needs to transmit a high priority message it will select the resources from the high priority contention pools. The receive entity, such as another vehicle UE, RSU, or eNB will monitor all the high priority contention pools.

For example, multiple contention pools are mapped to multiple priorities. In other words, message types of different priority will have one or more contention pools. For different messages, the transmit communications device 400 will map the message to a certain priority according to some pre-defined mappings, then select the resources from the contention pools in accordance with the message priority. The receive entity, such as another vehicle UE, RSU, eNB will monitor all the priority contention pools. The message to the communications devices to allocate different priority messages to different priority contention pools could be realized by broadcast signalling (applicable for all the vehicles within the broadcast coverage), by dedicated signalling (applicable for a group of vehicles, semi-static allocation is possible), or by layer 1 dynamic signalling. In addition, the entity to transmit the contention pool allocation information could be an eNB (for the uplink transmission from its serving vehicles), a RSU (for the uplink transmission from its serving vehicles, as well as the transmission between the vehicles).

For contention based UL transmission to the infrastructure equipment 201, a pre-scheduling CB grant pool will be allocated. This is different from the single CB grant in conventional CB PUSCH and is also different from, for example, device-to-device (D2D) mode 2 resource allocation. The CB grant pool of the present embodiment is signalled by layer 1 signalling in a semi-static manner. The allocation/re-allocation of the pool occurs via layer 1 signalling which is similar to conventional PDCCH signalling but which is only valid for a predetermined period of time. As previously mentioned, layer 1 signalling may include dynamic scheduling (in which the CB grant pool, as defined by its size, location in time and frequency, may be changed after an interval (that is, in a semi-static manner)) or SPS (in which the CB grant pool, together with its pattern (which defines how to use the resources of the radio frame for the CB grant pool—for example, the periodicity between CB grant pool resources of the radio frame) may be changed after an interval (that is, in a semi-static manner)). Layer 3 RRC signalling is another way to configure the pool allocation/re-allocation. However, the dynamic scheduling is more suitable for the fast change of CB grant pool configuration that is used with the present embodiment.

Figure 10:
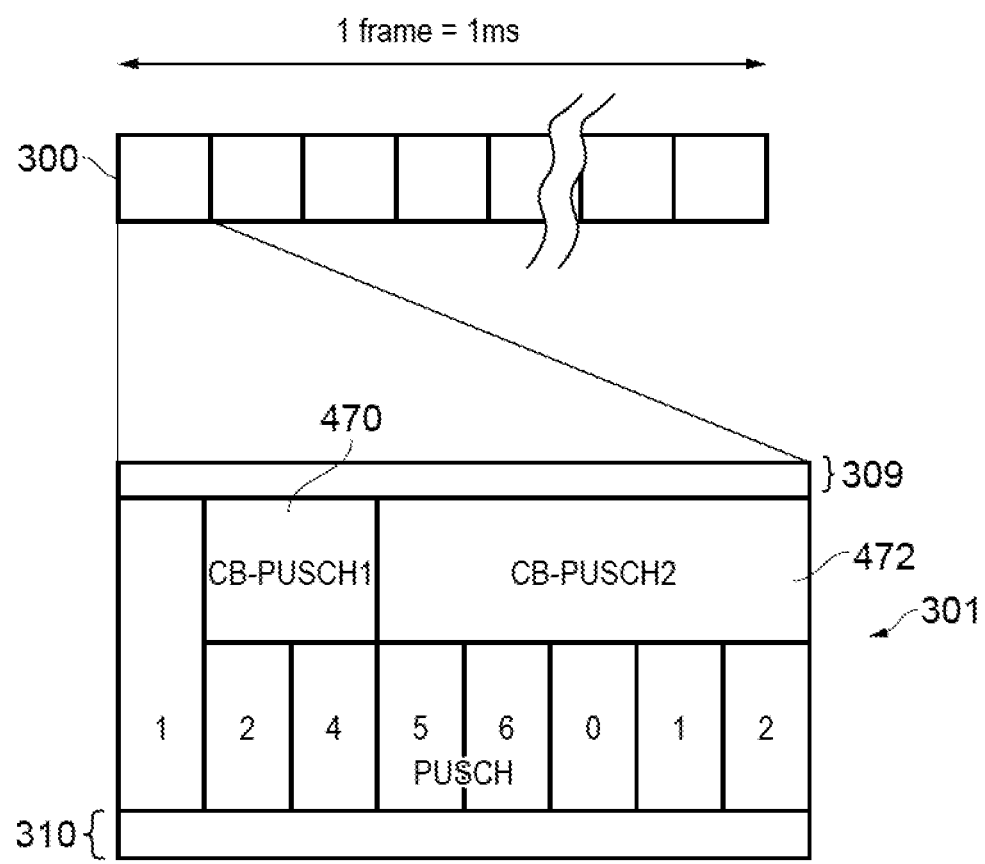
FIG. 10 schematically illustrates a representation of one of the sub-frames shown in FIG. 5 according to an embodiment of the present application.

FIG. 10 provides an illustrative representation of one of the sub-frames shown in FIG. 5 but adapted in accordance with the present technique to include different contention based physical resources providing different channels for communicating data with different parameters. Elements numbered in FIG. 10 have the same numerical references as those shown in FIG. 5. However, as shown in FIG. 10, the PUSCH section 301 is represented with the PUSCH sections which are available for transmitting data shown and the DMRS section is omitted. However, as shown in FIG. 10, the PUSCH is divided into different contention based PUSCH regions 470, 472 for transmitting data using different contention based techniques. As will be appreciated, although two contention based PUSCH regions 470, 472 are shown, there could be more than two, the number may correspond with or be proportional to the number of different levels or priorities for transmitting messages.

The PUSCH could also be divided into different contention based PUSCH regions in a time division manner. For example, subframe 1 and 2 resources could be allocated to higher priority messages whilst subframe 5 could be allocated to lower priority messages.

In addition to time division, the PUSCH could also be divided into different contention based PUSCH regions in a time-frequency division manner. For a given set of resource blocks, $m_0, m_1, m_2 \ldots m_k$, in the contention based resource block pool, wherein each resource block is arranged in increasing order of resource block indices and k is the maximum number of reserved resource blocks for contentious access among all the available resources for uplink transmission, the entire set of resource blocks could be divided into several parts. Each part could then be allocated for transmitting messages of different levels or priorities, for example $m_0$-$m_n$, where n<k is allocated for higher priority messages whilst $m_{n+1}$-$m_k$ is allocated for lower priority messages.

Figure 11:
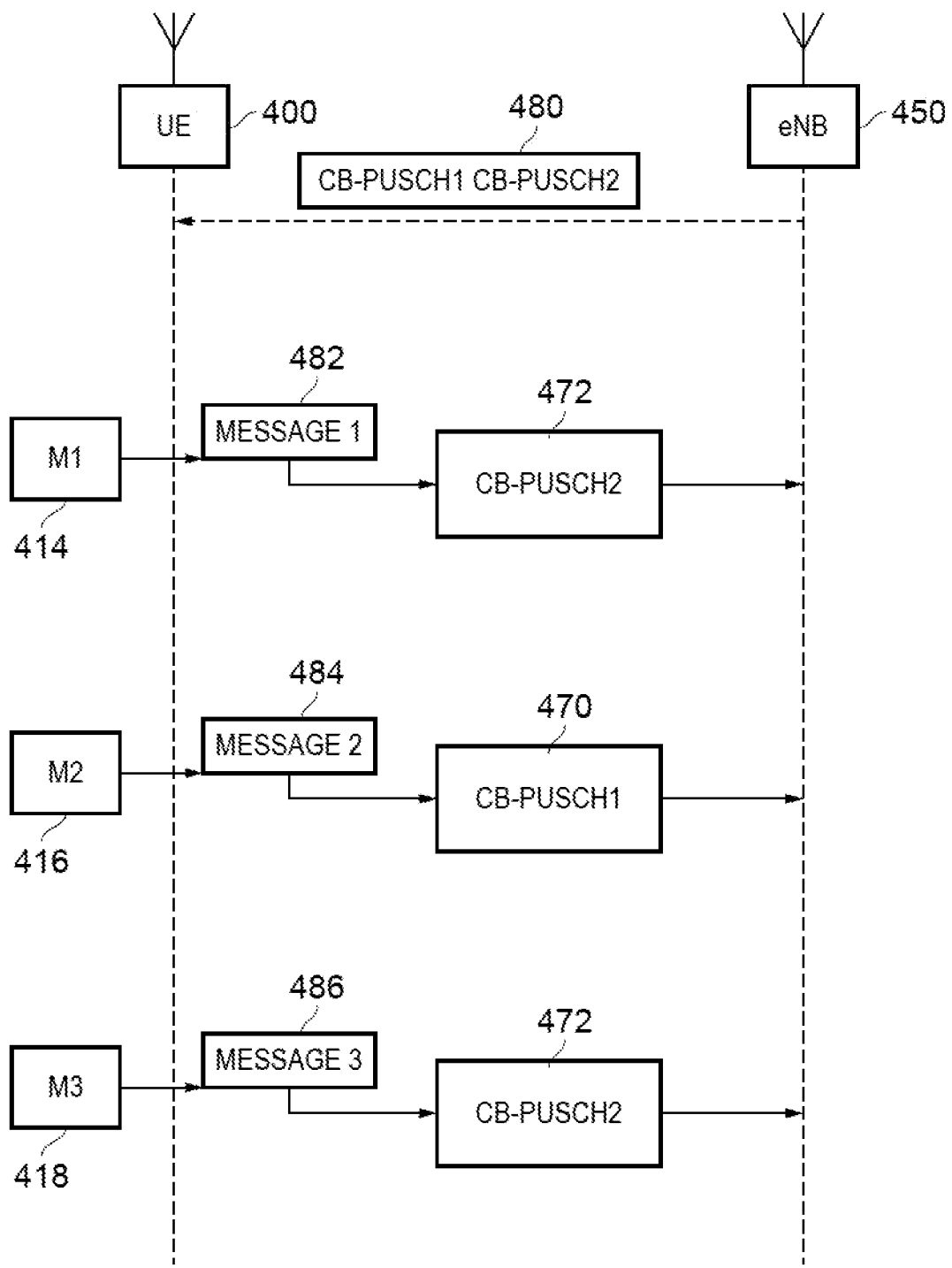
FIG. 11 schematically illustrates an exchange of messages and transmission of data between a communications device and an infrastructure equipment according to an embodiment of the present application.

As shown in FIG. 11, the communications device (UE) 400 and infrastructure equipment (eNode-b) 450 exchanges messages and transmit data using different CB-PUSCH regions in order to transmit different messages from the modules 416, 417, 418. However, as shown in FIG. 11, a first configuration is performed from the eNode-b 450 to a UE 400 transmitting an indication of the arrangement of physical resources forming the different CB PUSCH regions 470, 472 in a message 480. As explained above there are various techniques for transmitting the message 480.

As a first illustration the first module 414 generates a message 482. Because of the type of message generated by the first module 414, message 482 is transmitted by the second contention based PUSCH region 472. Correspondingly for example the second module 416 generates a message 484 and the third module 418 generates a message 486. However because of the type of message generated by the second module 416, the data is transmitted via the first contention based PUSCH region 470 as explained above. In another embodiment of the present disclosure the controller 460 of the infrastructure equipment 201 is configured to change the allocation of the physical resources for one or more of the physical channels after a period of time. Accordingly, the physical resources for the one or more physical channels are dynamically scheduled. This may include multiple CB pooling scheduling with multiple priorities, location based scheduling, proximity based scheduling, and simultaneous SR based scheduling. This may also include SR based, SPS based or CB mode scheduling. For example, if there is no latest SPS resource or SR resources to send the message, it is better to turn to a contention based scheme. The controller 460 of the infrastructure equipment 201 is then configured with the transmitter 462 to transmit an indication of the determined allocation of physical resources of the wireless access interface to the one or more communications devices 400 via the wireless access interface each time the allocations of physical resources is changed.

The communications device 400 may have a plurality of messages to be transmitted. For example broadcasts of event triggered or DENM messages may be repeated with a certain frequency or periodicity as long as the relevant event persists. Equally, periodic or CAM messages are sent at a given frequency or periodicity in order to transmit information about the vehicle. In an embodiment of the present disclosure the controller 402 of the communications device 400 may be configured with the transmitter 404 to transmit a plurality of message via the selected physical channel to the infrastructure equipment 201 via the wireless access interface. In this embodiment, the first transmitted message also includes an indication of the periodicity of the plurality of messages to be transmitted. The controller 460 of the infrastructure equipment 201 is then configured with the receiver 464 to receive the plurality of message from one or more of the communications devices 400 via the selected one of the physical channels, including the indication of the periodicity of the plurality of messages to be received included in the first message to be received. In other words, in the initial resource competition stage the transmitter vehicle will indicate the message type and priority. Furthermore, if it is the periodic message it will also indicate its periodicity. If the contention is successful then resources are allocated based on the message type and priority. As an alternative, the message type, priority and/or periodicity can be sent on the control channel, e.g. PUCCH.

In order to reduce a probability of collision when transmitting a plurality of messages, duplicate or subsequent messages after a first message to be transmitted may not be transmitted across the network. For example, with geo-location based message transmission and reception, an initial message may be transmitted across the entire network whilst the remaining messages may only be transmitted within a given range or area in which a vehicle is situated. Equally, the transmission range for transmitting the remaining messages may be reduced by adjusting the transmission power of the transmitter. Accordingly, a single message (the first message) can be transmitted to inform the entire network of an event. The remaining messages are then only transmitted to vehicles and communications devices in the same area or within a given range of the transmitting device, such as those vehicles likely to be affected by the event triggering the message. This allows resources in other parts of the network to be reallocated, further preventing collision.

In another embodiment of the present disclosure the contentious access technique to be used via the selected physical channel includes semi persistent allocation of the physical resources depending on the periodicity of the messages to be transmitted from the communications device to the infrastructure equipment.

In this embodiment, for the event triggered message (the first message transmitted by the communications device 400) an acknowledge will be sent from the receiving device, such as the infrastructure equipment 201, to the transmitter communications device 400. For the periodic message, the remaining transmission instances will be reserved for this communications device 400 in accordance with its message periodicity. This contention based SPS-like scheme could be implemented as a complementary scheme as SPS enhancement for V2X. This contention based SPS-like scheme has the advantage that there is no need to wait for the SC period for the initial contention on PC5 and no need of the SPS UL grant allocation on Uu. Further, especially when the periodic message or the event triggered message has been triggered but there is no latest SPS resource or SR resources to send the message, it is better to turn to a contention based scheme for a try. Multiple contention based SPS-like transmissions can be configured in one communications device as long as the communications device is successful in its initial contention. The periodicity may vary according to the transmitted messages. If the initial transmission attempt fails no response will be received. For an event triggered message, the communications device can attempt to re-transmit the message using the SR based scheme. For a periodic message, according to its SPS configuration, the communications device will decide whether to contend the second time or turn to the SPS scheme. The event triggered message and/or high priority message transmission attempt could be set with higher access probability than the others.

Once the final message of the plurality of messages has been transmitted the controller 402 of the communications device 400 may be configured with the transmitter 404 to transmit a release request message via the selected physical channel to the infrastructure equipment 201. The release request message indicates that the allocated physical resources are no longer required. The controller 460 of the infrastructure equipment 201 is then configured with the receiver 464 to receive the release request message from one or more of the communications devices 400 and to release the physical resources of the channel allocated for the plurality of messages by re-allocating the physical resources of the wireless access interface to other communications devices.

In this embodiment, for the reserved SPS-like resources, if the communications device 400 does not have any data to send, it will send the release request to the infrastructure equipment 201 of the network, e.g. on PUCCH. With this indication, the infrastructure equipment 201 will release those resources for the other communication devices to use. For example, the termination of an event driven or DENMs message is either automatically achieved once the event disappears after a predetermined time, or by the communications device 400 generates a release request to infrastructure equipment 201 to inform the network that the event that triggered the plurality of messages has disappeared. In the case where the termination of the event driven massage is after a predetermined time, the controller 402 of the communications device 400 is able to determine the number of messages to be transmitted based on the periodicity of the messages as the predetermined time after the event that messages should be send. The controller 402 can then be configured with the transmitter 404 to send the release request to the infrastructure equipment 201 after the last message in the plurality of messages has been transmitted. In the case where the communications device 400 determines that the event that triggered the plurality of messages has disappeared, the communications device 400 will send the release request to the infrastructure equipment 201 in response to determining that the event that triggered the plurality of messages has disappeared. In the case of periodic or CAM messages certain use cases, such as vehicle location and speed reporting, will occur whenever the vehicle and associated vehicle communication device 400 are switched on. Accordingly, the controller 402 of the communications device may be configured with the transmitter to transmit a release request to the infrastructure equipment 201 after a predetermined period of time such that the infrastructure equipment 201 does not allocated physical resource to transmission of periodic or CAM messages indefinitely.

In another embodiment of the present disclosure the controller 402 of the communications device 400 receives the messages to be transmitted from the one or more applications running on one or more processors 412. Each of the applications is configured to provide an indication of the priority level of each of the messages to be transmitted.

In another embodiment of the present disclosure, the messages to be transmitted are generated by the one or more modules 414, 416, 418 within the communications device 400. Each of the modules 414, 416, 418 is associated with a different priority level. For example, one module may generate event triggered messages (DENM) based on collision avoidance calculations performed using the location, speed and estimated trajectory of a vehicle the communications device is installed within. Another module may generate periodic messages (CAM) based on calculations to determine the location and speed of the vehicle the communications device is installed within. Furthermore, the communications device may contain a plurality of modules, each of which associated with a different priority level of message within the same message type. For example, one module may generate forward collision warning messages whilst another may generate control loss warning messages.

Combination with Geo-Location Resource Allocation

In another embodiment of the present disclosure the controller 402 of the communications device 400 is configured to determine the location of the communications device 400. The controller 402 may be configured to receive an indication of the location of the communications device 400 from the location unit 410. It will be appreciated that, in an alternative embodiment, the location unit 410 may be located externally to the communications device 400. For example, the location unit 410 may be comprised as part of a separate, standalone device (such as a standalone GNSS device, not shown) which is configured to perform signalling with the controller 402 of the communications device 400 via a suitable wired or wireless interface (not shown). In this case, data indicative of the location of the location unit 410 of the standalone device is signalled to the controller 402 via the interface. The controller 402 is then configured to receive this signal and determine the location of the communications device 400. The externally located location unit 410 and communications device 400 will still be within vicinity of each other (such as within the same vehicle), however, so as to allow the controller 402 of the communications device 400 to effectively determine the correct predetermined geographical region (and hence the correct physical resources) to use for V2X communication (as explained below). In other words, the distance between the external location unit and the communications device 400 is such that, in terms of determining the predetermined geographical location in which the communications device 400 is located, the location of the external location unit is representative of the location of the communications device 400.

In another embodiment of the present disclosure the controller 402 of the communications device 400 is configured with the transmitter 404 to transmit via the wireless access interface an indication of the determined location of the communications device 400 to the infrastructure equipment 201. The controller 460 of the infrastructure equipment 201 is then configured with the receiver 464 to receive the indication of the location of the communications device 400 and allocate the physical resources based on the determined location of each of the communications devices 400 such that the allocation of physical resources is dependent upon the determined location of each of the one or more communications devices 400. The controller 460 of the infrastructure equipment 201 is then configured with the transmitter 462 to transmit an indication of the determined allocation of physical resources of the wireless access interface to the communications devices 400 via the wireless access interface. This indication of the physical channel is received by the receiver 406 of the communications device 400 and the controller 402 of the communications device is then configured with the transmitter 404 to transmit the message via the selected physical channel provided in response to the location indication. As described above, in this embodiment the allocation of physical resources for the selected physical channel is dependent upon the determined location of the communications device 400.

In V2X, a communications device 400 may report its location from time to time. By combining this location information with a scheduling request, the infrastructure equipment 201, such as a eNB or RSU, will understand that in a given area, a number of communications devices 400 have data to transmit. With this information, physical resources and physical channels will be allocated for these communications devices 400. It is noted that with the communications device 400 reporting of the geolocation information, the infrastructure equipment 201 can judge the communications device density within a given area.

In an alternative embodiment of the present disclosure the allocation of the physical resources for one or more of the physical channels comprises allocating physical resources to one or more geographical areas. In other words, the allocation of the physical resources for the selected physical channel is dependent upon the determined location of the communications device 400, but the infrastructure equipment 201 pre-allocates location based physical resources for one or more of the physical channels. This allocation of resource is then transmitted by the infrastructure equipment 201 via the wireless access interface to the network 100. The controller 402 of the communications device 400 is then configured to select one of the physical channels based on which one of the one or more geographical areas the determined location of the communications device is contained within. This allows the communications device 400 to select the correspond ng physical channel according to the determined location of the communications device 400 without having to transmit an indication of the determined location of the communications device 400 to the infrastructure equipment 201 via the wireless access interface. As such, the request response is not required.

In this embodiment, the allocation of physical resources can be combined with geo-location based resource allocation to further improve the spectrum efficiency and reduce collisions. For example, a vehicle communications device 400 may select a physical channel in accordance with the location of the communications device 400. The mapping between physical resources and communications device location is pre-defined. In this embodiment, for the vehicle communications device 400 adopting a CB-PUSCH transmission, there is also a pre-defined physical resource and physical channel mapping with the location. The contention physical resources may be within the location based physical resources. Once the communications device has determined its location, the transmitter vehicle communications device 400 selects the physical channel in the allocated physical resource in accordance with its location. As the physical resource can be re-used between different locations or geographical areas, the spectrum efficiency will be improved. Furthermore, with the adaptation of physical resource allocation to the contending vehicles, the collision will be minimized as well. For example, the physical resource allocation could be adapted based on the time of day and known traffic patterns, such as morning or evening rush hour. Additionally, the amount of physical resource allocated can be adapted based on the number of vehicles detected in a given areas, such as on a congested roadway. The physical resource allocation may also be adapted based on known traffic patterns related to events. For example, if an event triggered message is transmitted which relates to an accident on a given stretch of road, the amount of physical resource allocated may be increase in an area in the vicinity of the accident in anticipation of an increased number of vehicles in the area due to congestion around the accident location.

In an embodiment of the present disclosure the controller 402 of the communications device 400 is configured with the transmitter 404 to transmit the message via a default physical channel when the controller 402 detects that the communications device 400 has not received the indication of the allocation of physical resources of the wireless access interface. The default physical channel may be based on one or more of the priority of the message to be transmitted or the type of message to be transmitted (event driven or periodic). The controller 402 may also select a default physical channel to transmit the message via if it detects that the communications device 400 can not access the wireless access interface provided by the infrastructure equipment 201 which sent the indication of the allocation of physical resources. For example, a vehicle communications device may have moved out of range of the infrastructure equipment from which it received an indication of an allocation of physical resources. The vehicle communications device may have moved into range of a different infrastructure equipment from which it has not received an indication of an allocation of physical resources. Accordingly, the vehicle communications device may attempt to transmit message via a default physical channel initially, or until the vehicle communications device receives an allocation of physical resources from the infrastructure equipment it is currently within range of.

Vehicle Communications Device Grouping and Contention Pool Allocation

In another embodiment of the present disclosure, the controller 460 of the infrastructure equipment 201 is configured to allocate one or more of the communications devices 400 into one or more groups. In this embodiment communications devices 400 may be grouped together, with contention resource pool (physical resource) allocation being based on the corresponding groups. Grouping of communications devices together with physical resource allocation will also impact the CB-PUSCH transmission performance. The general principle is that a small number of physical channels and/or longer periodicity of contention resources is better for a small size of communications device group. The grouping of communications devices could be based on location, where communications devices within a given proximity will be grouped and share one or more common physical resources. The message that a given vehicle communications device is attempting to send may only be relevant or of interest to other vehicles in the vicinity of that vehicle communication device. For example, traffic condition warnings or roadwork warnings within a town or city may only be relevant within a small distance of the event, such as a few hundred metres. Accordingly, by grouping communications devices based on location, relevant messages can be transmitted and received within the group whilst freeing up resources in other parts of the network where the messages are less relevant.

It is noted that, in the context of the present embodiment, the term "group" refers to a selection of one or more communications devices 400 from a set of communications devices all communicating with the network 100 via the same infrastructure equipment 201. The infrastructure equipment 201 via which a particular communications device 400 communicates with the network 100 may be referred to as the serving network node for that communications device 400.

As previously mentioned, the physical resource allocation and number of physical channels allocated to a particular communications device group is a trade-off between collision probability and resource waste. Too little physical resource and too few channels will lead to a high collision probability that increases the latency (due to an increase in the number of UL re-transmissions) whereas too much physical resource and too many channels will lead to resource waste. The physical resource allocation and required number of physical channels depends on the group size as well as the data traffic demand/activity of the group. Generally, more physical resource and a larger number of physical channels will be allocated to larger group or to a group with a higher data traffic load. More physical resource may be provided by allocating a greater number of physical channels. In addition, the periodicity of the physical resource may be made smaller (resulting in less waiting time for a re-transmission) and/or the CB interval may be made larger. Furthermore, communications devices with larger amounts of data to transmit may be reserved with more CB resources following the first successful contention (reserving CB grant resources for particular communications devices is described in more detail below). The maximum number of groups in one local cell depends on the overall local cell resource size and the size of each group. In some embodiments, a limit specifying the maximum number of groups in one local cell may be implemented.

Additionally, the communications devices could be grouped based on a simultaneous request principle. In such a configuration, any communications device 400 that sends a scheduling request within a pre-defined period will be allocated with one or more common physical resources. The corresponding number of physical channels will be allocated according to the message priority.

In another embodiment of the present disclosure the controller 460 of the infrastructure equipment 201 is configured to allocate a semi-static uplink grant pool for one of the groups of communications devices. As described the applicant's co-pending European patent application number 16160759, contention pool based CB-PUSCH is a more attractive way to improve CB transmission performance, comparing with the conventional single UL grant based CB transmission. So in general, the CB-PUSCH for V2X is contention pool based. A semi-static UL grant pool is allocated for a group of vehicles communication devices 400. This UL grant pool is specific for each group and is indicated in the control information of the infrastructure equipment 201 e.g. eNB, RSU etc. The UL grant pool may be valid for a period and could be re-configured by dynamic UL grant signalling or RRC signalling or broadcast signalling.

In another embodiment of the present disclosure the indication of the determined allocation of physical resources of the wireless access interface is transmitted by one of broadcast signalling, dedicated signalling or layer 1 dynamic signalling. In this application, broadcast signalling is applicable for all the vehicles (communications devices 400) within the broadcast coverage, whilst dedicated signalling is applicable for a group of vehicles, for example where a semi-static allocation is possible. In addition, the infrastructure equipment 201 could be an eNB (for the uplink transmission from its serving vehicles) or a RSU (for the uplink transmission from its serving vehicles, as well as the transmission between the vehicles).

Summary of Operation

Figure 12:
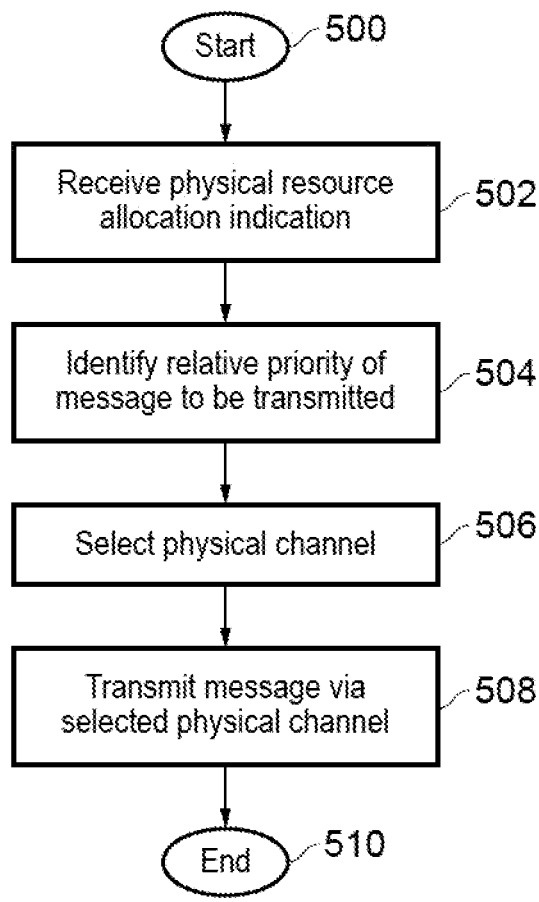
FIG. 12 schematically illustrates a process according to an embodiment of the present disclosure.

FIG. 12 illustrates a method for controlling a communications device 400 for transmitting a message to an infrastructure equipment 201 of a mobile communications network 100 in accordance with an embodiment of the present disclosure. The process starts at step 500. At step 502, the receiving of the communications device 400 receives an indication of an allocation of physical resources of the wireless access interface. This indication is received from the infrastructure equipment 201 via the wireless access interface provided by the infrastructure equipment 201. The allocation of physical resources of the wireless access interface provides a plurality of different physical channels of different types. Each of the different types of physical channels is defined for transmitting messages in accordance with a different priority level using a contentious access technique. The allocation of physical resources is dependent upon the priority of the message to be transmitted and the contentious access technique.

At step 504, the relative priority for transmitting one or more of the messages to the infrastructure equipment 201 is identified. This may be provided by one or more applications running on one or more processors 412 within the communications device 400, each of which provides an indication of the priority level of each of the messages.

At step 506, one or more of the physical channels is selected in accordance with the identified relative priority and at step 508 the message is transmitted via the selected physical channel. The message is transmitted via the selected physical channel in accordance with the contentious access technique determined for the selected physical channel provided by the received indication.

Figure 13:
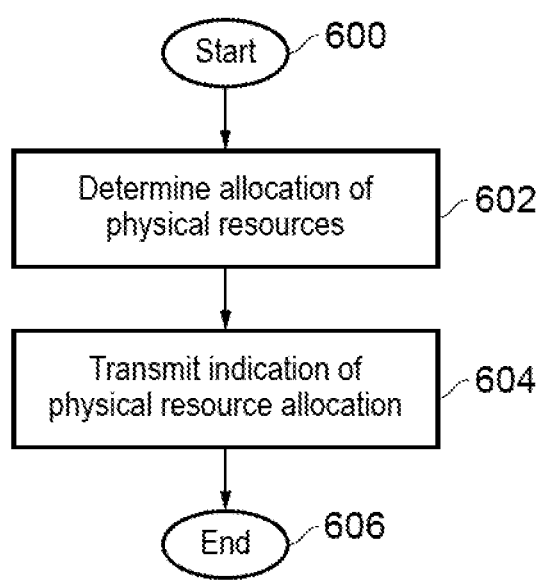
FIG. 13 schematically illustrates a process according to an embodiment of the present disclosure.

FIG. 13 illustrates a method of controlling infrastructure equipment 201 for use with a mobile communications network 100 in accordance with an embodiment of the present disclosure. The process starts at step 600.

At step 602, an allocation of physical resources of a wireless access interface is determined. The physical resources of the wireless access interface provide a plurality of different physical channels of different type. Each of the different types of physical channels is defined for transmitting messages in accordance with a different priority level using a contentious access technique. The allocation of physical resources is dependent upon the priority of the message and the contentious access technique.

At step 604, an indication of the determined allocation of physical resources of the wireless access interface is transmitted via the wireless access interface. This indication is transmitted via the wireless access interface to one or more communications devices 400.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

Various embodiments of the present technique are described with reference to the following numbered clauses:

1. A communications device for transmitting a message to an infrastructure equipment of a mobile communications network, the communications device comprising a transmitter configured to transmit signals via a wireless access interface provided by the infrastructure equipment, a receiver configured to receive signals from the infrastructure equipment via the wireless access interface, and a controller configured to control the transmitter and the receiver to transmit and/or receive the signals, the controller being configured with the receiver to receive an indication of an allocation of physical resources of the wireless access interface providing plurality of different physical channels of different types, each of the different types of physical channels being defined for transmitting messages in accordance with a different priority level using a contentious access technique, the allocation of the physical resources being dependent upon the priority of the message and the contentious access technique, and the controller is configured with the transmitter to identify a relative priority for transmitting one or more of the messages to the infrastructure equipment, to select one of the physical channels in accordance with the identified relative priority, and to transmit the message via the select physical channel, wherein the message is transmitted via the selected physical channel in accordance with the contentious access technique determined for the selected physical channel provided by the received indication.

2. A communications device of Clause 1, wherein the allocation of the physical resources for one or more of the physical channels is changed after receiving a further indication, so the physical resources for the one or more physical channels are dynamically scheduled.

3. A communications device of Clause 1 or Clause 2, wherein the controller is configured with the transmitter to transmit a plurality of messages via a selected one of the physical channels and a first transmitted message also includes an indication of a periodicity of the plurality of messages to be transmitted.

4. A communications device of Clause 3, wherein the contentious access technique to be used via the selected physical channel includes semi-persistent allocation of the physical resources depending on the periodicity of the messages to be transmitted.

5. A communications device of Clause 4, wherein the controller is configured with the transmitter to transmit a release request message via the selected physical channel, wherein the release request message indicates that the allocated physical resources are no longer required.

6. A communications device of any one of the preceding clauses, wherein the controller receives the messages to be transmitted from one or more applications, each of which provides an indication of the priority level of each of the messages.

7. A communications device of any one of the preceding clauses, comprising one or more modules configured to generate the messages, wherein each module is associated with a different one of the priority levels.

8. A communications device of any one of the preceding clauses, wherein the controller is configured to determine a location of the communications device.

9. A communications device of Clause 8, wherein the controller is configured with the transmitter to transmit via the wireless access interface an indication of the determined location of the communications device, and the indication of the physical channel is received in response to the transmitted indication of the determined location, and to transmit the message via the selected physical channel provided in response to the location indication, the allocation of the physical resources for the selected physical channel being dependent upon the determined location of the communications device.

10. A communications device of Clause 8, wherein the allocation of the physical resources comprising allocating physical resources to one or more geographical areas, and wherein the controller is configured to select one of the physical channels based on which one of the one or more geographical areas the determined location of the communications device is contained within.

11. A communications device of any one of the preceding clauses, wherein the controller is configured with the transmitter to transmit the message via a default physical channel when the controller detects that the communications device has not received the indication of the allocation of physical resources of the wireless access interface.

12. Infrastructure equipment for use with a mobile communications network, the infrastructure equipment comprising:

a transmitter configured to transmit signals to one or more communications devices via a wireless access interface, a receiver configured to receive signals from the one or more communications devices via the wireless access interface, and a controller configured to control the transmitter and the receiver to transmit and/or receive the signals, the controller being configured to determine an allocation of physical resources of the wireless access interface providing a plurality of different physical channels of different types, each of the different types of physical channels being defined for transmitting messages in accordance with a different priority level using a contentious access technique, the allocation of the physical resources being dependent upon the priority of the message and the contentious access technique, and the controller is configured with the transmitter to transmit an indication of the determined allocation of physical resources of the wireless access interface to the one or more communications devices via the wireless access interface.

13. An infrastructure equipment of Clause 12, wherein the allocation of the physical resources for one or more of the physical channels is changed after a period of time, so the physical resources for the one or more physical channels are dynamically scheduled.

14. An infrastructure equipment of Clause 12 or Clause 13, wherein the controller is configured with the receiver to receive a plurality of messages from one of more of the communications devices via a selected one of the physical channels and a first of the received messages includes an indication of the periodicity of the plurality of messages to be received.

15. An infrastructure equipment of Clause 14, wherein the contentious access technique to be used via the selected physical channel includes semi-persistent allocation of physical resources depending on the periodicity of the messages to be received.

16. An infrastructure equipment of Clause 15, wherein the controller is configured with the receiver to receive a release request message from one or more of the communications devices, and the controller is configured to release the physical resources of the channel allocated for the plurality of messages by re-allocating the physical resources of the wireless access interface to other communications devices.

17. An infrastructure equipment of any one of Clauses 12-16, wherein the controller is configured with the receiver to receive from one or more of the communications devices an indication of a location of each of the communications devices.

18. An infrastructure equipment of Clause 17, wherein the allocation of the physical resources is dependent upon the determined location of each of the one or more communications devices.

19. An infrastructure equipment of Clause 17, wherein the controller is configured to determine a number of communications devices within a given area based upon the determined location of each of the one or more communications devices, and wherein the allocation of the physical resources is dependent upon the determined number of communications devices within the given area.

20. An infrastructure equipment of any one of Clauses 12-16, wherein the allocation of the physical resources for one or more of the physical channels comprises allocating physical resources to one or more geographical areas.

21. An infrastructure equipment of any one of Clauses 12-20, wherein the one or more communications devices are allocated to one or more groups.

22. An infrastructure equipment of Clause 21, wherein a semi-static uplink grant pool is allocated for one of the one or more groups of communications devices.

23. An infrastructure equipment of any one of Clauses 12-22, wherein the indication of the determined allocation of physical resources of the wireless access interface is transmitted by one of broadcast signalling, dedicated signalling or layer 1 dynamic signalling.

24. A wireless telecommunications system comprising a communications device according to any one of Clauses 1-11 and infrastructure equipment according to any one of Clauses 12-23.

25. A method of controlling a communications device for transmitting a message to an infrastructure equipment of a mobile communications network, the method comprising: controlling the receiver to receive from the infrastructure equipment via a wireless access interface provided by the infrastructure equipment, an indication of an allocation of physical resources of the wireless access interface providing plurality of different physical channels of different types, each of the different types of physical channels being defined for transmitting messages in accordance with a different priority level using a contentious access technique, the allocation of the physical resources being dependent upon the priority of the message and the contentious access technique,
identifying a relative priority for transmitting one or more of the messages to the infrastructure equipment,
selecting one of the physical channels in accordance with the identified relative priority, and
controlling a transmitter to transmit the message via the select physical channel, wherein the message is transmitted via the selected physical channel in accordance with the contentious access technique determined for the selected physical channel provided by the received indication.

26. A method of controlling infrastructure equipment for use with a mobile communications network, the method comprising:
determining an allocation of physical resources of a wireless access interface providing a plurality of different physical channels of different types, each of the different types of physical channels being defined for transmitting messages in accordance with a different priority level using a contentious access technique, the allocation of the physical resources being dependent upon the priority of the message and the contentious access technique, and
controlling a transmitter to transmit, via the wireless access interface, an indication of the determined allocation of physical resources of the wireless access interface to one or more communications devices.

Numerous modifications and variations of the present disclosure are possible in light of the above teachings. It is therefore to be understood that within the scope of the appended clauses the disclosure may be practiced otherwise than as specifically described herein. Also, whenever an embodiment is disclosed in respect of an apparatus or system, the teachings are also disclosed for the corresponding method. Likewise, whenever an aspect is disclosed in respect of a method, the teachings are also disclosed for any suitable corresponding apparatus or system.

In so far as embodiments of the disclosure have been described as being implemented, at least in part, by software-controlled data processing apparatus, it will be appreciated that a non-transitory machine-readable medium carrying such software, such as an optical disk, a magnetic disk semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 4, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [9].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 4, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [9].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] Holma H. and Toskala A. "LTE for UMTS OFDMA and SC-FDMA Based Radio Access". John Wiley & Sons Limited, January 2010.
[2] ETSI TS 102 637-3 V1.1.1 (September 2010) "Intelligent Transport Systems (ITS): Vehicular Communications; Basic Set of Applications; Part 3: Specifications of Decentralized Environmental Notification Basic Service"
[3] ETSI TS 102 637-2 V1.1.1 (March 2011) "Intelligent Transport Systems (ITS): Vehicular Communication: Basic Set of Applications; Part 2: Specification of Cooperative Awareness Basic Service"
[4] ETSI TS 102 637-1 V1.1.1 (September 2010) "Intelligent Transport Systems (ITS); Vehicular Communications; Basic Set of Applications; Part 1: Functional Requirements"

[5] 3GPP TR 22.885 V14.0.0 (December 2015) "Study on LTE support for Vehicle to Everything (V2X) services"
[6] ETSI TS 101 539-3 V1.1.1 (November 2013) "Intelligent Transport Systems (ITS): V2X Applications; Part 3: Longitudinal Collision Risk Warning (LCRW) application requirements specification"
[7] "Vehicle Information Exchange Needs for Mobility Applications" Final Report FHWA-JPO-12-021 (February 2012)
[8] R2-156300. Text Proposal capturing outcome of email discussion: [91bis #34][LTE/LATRED] CB-PUSCH. Anaheim, USA, 16-20 Nov. 2015
[9] LTE for UMTS: OFDMA and SC-FDMA Based Radio Access, Harris Holma and Antti Toskala, Wiley 2009, ISBN 978-0-470-99401-6.

The invention claimed is:

1. A communications device for transmitting a message to an infrastructure equipment of a mobile communications network, the communications device comprising
a transmitter configured to transmit signals via a wireless access interface provided by the infrastructure equipment,
a receiver configured to receive signals from the infrastructure equipment via the wireless access interface, and
circuitry configured to control the transmitter and the receiver to transmit and/or receive the signals, the circuitry being configured to
receive an indication of an allocation of physical resources of the wireless access interface providing a plurality of different physical channels of different types, each of the different types of physical channels being defined for transmitting messages in accordance with a different priority level using a contentious access technique, the allocation of the physical resources being dependent upon the priority of the message and the contentious access technique,
identify a relative priority for transmitting one or more of the messages to the infrastructure equipment, wherein the messages are allocated to separate contention pools, wherein a size of a contention pool is based on an amount of physical resources and physical channels allocated, wherein the size of the contention pool to which the messages are allocated is based on the relative priority level of the message so that an access probability is proportional to the priority of the message to be transmitted,
select one of the physical channels in accordance with the identified relative priority, wherein one or more applications running on the communications device, from which the one or more messages are received, provide an indication of the relative priority level of each of the messages to be transmitted, and
transmit the message via the select physical channel, wherein the message is transmitted via the selected physical channel in accordance with the contentious access technique determined for the selected physical channel provided by the received indication,
wherein each message is generated by a plurality of separate hardware components in the communications device, wherein each of the plurality of separate hardware components is associated with different priority levels such that each of the plurality of separate hardware components only generates messages having priority levels corresponding to that hardware component, wherein the priority level of each message includes a first priority level of the message based on the message type and a second priority level in addition to the first priority level, wherein the second priority level is different for messages of the same type based on a criticality of a traffic situation,
wherein in order to reduce a probability of collision when transmitting a plurality of messages, an initial message is transmitted across the entire network and remaining messages are only transmitted within a given range or area in which the communications device is situated.

2. The communications device of claim 1, wherein the allocation of the physical resources for one or more of the physical channels is changed after receiving a further indication, so the physical resources for the one or more physical channels are dynamically scheduled.

3. The communications device of claim 1, wherein the circuitry is further configured to
transmit a plurality of messages via a selected one of the physical channels and a first transmitted message also includes an indication of a periodicity of the plurality of messages to be transmitted.

4. The communications device of claim 3, wherein the contentious access technique to be used via the selected physical channel includes semi-persistent allocation of the physical resources depending on the periodicity of the messages to be transmitted.

5. The communications device of claim 4, wherein the circuitry is further configured to
transmit a release request message via the selected physical channel, wherein the release request message indicates that the allocated physical resources are no longer required.

6. The communications device of claim 1, wherein the circuitry is further configured to determine a location of the communications device.

7. The communications device of claim 6, wherein the circuitry is further configured to transmit via the wireless access interface an indication of the determined location of the communications device, and the indication of the physical channel is received in response to the transmitted indication of the determined location, and to transmit the message via the selected physical channel provided in response to the location indication, the allocation of the physical resources for the selected physical channel being dependent upon the determined location of the communications device.

8. The communications device of claim 6, wherein the allocation of the physical resources comprising allocating physical resources to one or more geographical areas, and wherein the controller is configured to select one of the physical channels based on which one of the one or more geographical areas the determined location of the communications device is contained within.

9. The communications device of claim 1, wherein the circuitry is further configured to transmit the message via a default physical channel when the controller detects that the communications device has not received the indication of the allocation of physical resources of the wireless access interface.

10. The communications device of claim 1, wherein the plurality of separate hardware components includes a subset of the plurality of the separate hardware components, each of the subset being associated with a different priority level of message within the same message type.

11. Infrastructure equipment for use with a mobile communications network, the infrastructure equipment comprising:

a transmitter configured to transmit signals to one or more communications devices via a wireless access interface, a receiver configured to receive signals from the one or more communications devices via the wireless access interface, and circuitry configured to control the transmitter and the receiver to transmit and/or receive the signals, the circuitry being configured to determine an allocation of physical resources of the wireless access interface providing a plurality of different physical channels of different types, each of the different types of physical channels being defined for transmitting messages in accordance with a different priority level using a contentious access technique, the allocation of the physical resources being dependent upon the priority of the message and the contentious access technique, wherein one or more applications running on the one or more communications devices, from which the messages are received, provide an indication of the priority level of each of the messages to be transmitted, and transmit an indication of the determined allocation of physical resources of the wireless access interface to the one or more communications devices via the wireless access interface, wherein the messages are allocated to separate contention pools, wherein a size of a contention pool is based on an amount of physical resources and physical channels allocated, wherein the size of the contention pool to which the messages are allocated is based on the relative priority level of the message so that an access probability is proportional to the priority of the message to be transmitted, wherein each message received from the communications device is generated by one of a plurality of separate hardware components in the communications device, wherein each of the plurality of separate hardware components is associated with different priority levels such that each of the plurality of separate hardware components only generates messages having priority levels corresponding to that hardware component, wherein the priority level of each message includes a first priority level of the message based on the message type and a second priority level in addition to the first priority level, wherein the second priority level is different for messages of the same type based on a criticality of a traffic situation, wherein in order to reduce a probability of collision when transmitting a plurality of messages, an initial message is transmitted across the entire network and remaining messages are only transmitted within a given range or area in which the communications device is situated.

12. The infrastructure equipment of claim 11, wherein the allocation of the physical resources for one or more of the physical channels is changed after a period of time, so the physical resources for the one or more physical channels are dynamically scheduled.

13. The infrastructure equipment of claim 11, wherein the circuitry is further configured to receive a plurality of messages from one of more of the communications devices via a selected one of the physical channels and a first of the received messages includes an indication of the periodicity of the plurality of messages to be received.

14. The infrastructure equipment of claim 13, wherein the contentious access technique to be used via the selected physical channel includes semi-persistent allocation of physical resources depending on the periodicity of the messages to be received.

15. The infrastructure equipment of claim 14, wherein the circuitry is further configured to receive a release request message from one or more of the communications devices, and release the physical resources of the channel allocated for the plurality of messages by re-allocating the physical resources of the wireless access interface to other communications devices.

16. The infrastructure equipment of claim 11, wherein the circuitry is further configured with the receiver to receive from one or more of the communications devices an indication of a location of each of the communications devices.

17. The infrastructure equipment of claim 16, wherein the allocation of the physical resources is dependent upon the determined location of each of the one or more communications devices.

18. The infrastructure equipment of claim 16, wherein the circuitry is further configured to determine a number of communications devices within a given area based upon the determined location of each of the one or more communications devices, and wherein the allocation of the physical resources is dependent upon the determined number of communications devices within the given area.

19. A method of controlling a communications device for transmitting a message to an infrastructure equipment of a mobile communications network, the method comprising:

controlling the receiver to receive from the infrastructure equipment via a wireless access interface provided by the infrastructure equipment, an indication of an allocation of physical resources of the wireless access interface providing plurality of different physical channels of different types, each of the different types of physical channels being defined for transmitting messages in accordance with a different priority level using a contentious access technique, the allocation of the physical resources being dependent upon the priority of the message and the contentious access technique, identifying a relative priority for transmitting one or more of the messages to the infrastructure equipment, wherein the messages are allocated to separate contention pools, wherein a size of a contention pool is based on an amount of physical resources and physical channels allocated, wherein the size of the contention pool to which the messages are allocated is based on the relative priority level of the message so that an access probability is proportional to the priority of the message to be transmitted, selecting one of the physical channels in accordance with the identified relative priority, wherein one or more applications running on the communications device, from which the one or more messages are received, provide an indication of the priority level of each of the messages to be transmitted, and controlling a transmitter to transmit the message via the select physical channel, wherein the message is transmitted via the selected physical channel in accordance with the contentious access technique determined for the selected physical channel provided by the received indication, wherein each message is generated by a plurality of separate hardware components in the communications device, wherein each of the plurality of separate hardware components is associated with different priority levels such that each of the plurality of separate hardware components only generates messages having priority levels corresponding to that hardware component, wherein the priority level of each message includes a first priority level of the message based on the message type and a second priority level in addition to the first priority level, wherein the second priority level is different for messages of the same type based on a criticality of a traffic situation, wherein in order to reduce a probability of collision when transmitting a plurality of messages, an initial message is transmitted across the entire network and remaining messages are only transmitted within a given range or area in which the communications device is situated.

\* \* \* \* \*